(12) United States Patent
Itou et al.

(10) Patent No.: US 11,139,496 B2
(45) Date of Patent: Oct. 5, 2021

(54) FUEL CELL SYSTEM

(71) Applicant: TOYOTA JIDOSHA KABUSHIKI KAISHA, Toyota (JP)

(72) Inventors: Masayuki Itou, Sunto-gun (JP); Yasushi Araki, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/901,473

(22) Filed: Jun. 15, 2020

(65) Prior Publication Data

US 2020/0403256 A1 Dec. 24, 2020

(30) Foreign Application Priority Data

Jun. 18, 2019 (JP) .............................. JP2019-113177

(51) Int. Cl.
| | | |
|---|---|---|
| *H01M 8/04664* | (2016.01) | |
| *H01M 8/04537* | (2016.01) | |
| *H01M 8/0444* | (2016.01) | |
| *H01M 8/0438* | (2016.01) | |

(Continued)

(52) U.S. Cl.
CPC ... *H01M 8/04679* (2013.01); *H01M 8/04388* (2013.01); *H01M 8/04417* (2013.01); *H01M 8/04447* (2013.01); *H01M 8/04455* (2013.01); *H01M 8/04552* (2013.01); *H01M 8/04559* (2013.01); *H01M 8/04582* (2013.01); *H01M 8/04671* (2013.01); *H01M 8/249* (2013.01); *H01M 2008/1095* (2013.01); *H01M 2250/20* (2013.01)

(58) Field of Classification Search
CPC ......... H01M 8/04447; H01M 8/04455; H01M 8/04388; H01M 8/04679; H01M 8/04671; H01M 8/04552; H01M 8/04417; H01M 8/04559; H01M 8/04582; H01M 8/249; H01M 2008/1095; H01M 2250/20; Y02E 60/50

See application file for complete search history.

(56) References Cited

U.S. PATENT DOCUMENTS

| | | | | |
|---|---|---|---|---|
| 2005/0164069 A1* | 7/2005 | Margiott | ........... | H01M 8/04089 429/432 |
| 2008/0145715 A1* | 6/2008 | Lienkamp | ......... | H01M 8/04761 429/432 |
| 2008/0311437 A1* | 12/2008 | Sienkowski | ........ | H01M 8/2483 429/410 |

FOREIGN PATENT DOCUMENTS

| | | |
|---|---|---|
| JP | 2004-171880 | 6/2004 |
| JP | 2004-171890 | 6/2004 |
| JP | 2006-049259 | 2/2006 |

* cited by examiner

*Primary Examiner* — Brittany L Raymond
(74) *Attorney, Agent, or Firm* — Finnegan, Henderson, Farabow, Garrett & Dunner, LLP

(57) ABSTRACT

A fuel cell system includes a first fuel cell, second fuel cell, first voltage detector, second voltage detector, and controller. The first voltage detector detects voltage of first unit cells of the first fuel cell for every "N" unit cells on average, and the second voltage detector detects voltage of the second fuel cell as a whole, or detects voltage of second unit cells of the second fuel cell for every "M" unit cells on average, where "M" is larger than "N". The controller determines whether any of the second unit cells is in a fuel deficiency state, based on the detection result of the first voltage detector, when a predetermined condition under which states of the first fuel cell and the second fuel cell are regarded as being close to each other is satisfied.

14 Claims, 11 Drawing Sheets

(51) Int. Cl.
*H01M 8/249* (2016.01)
*H01M 8/1018* (2016.01)

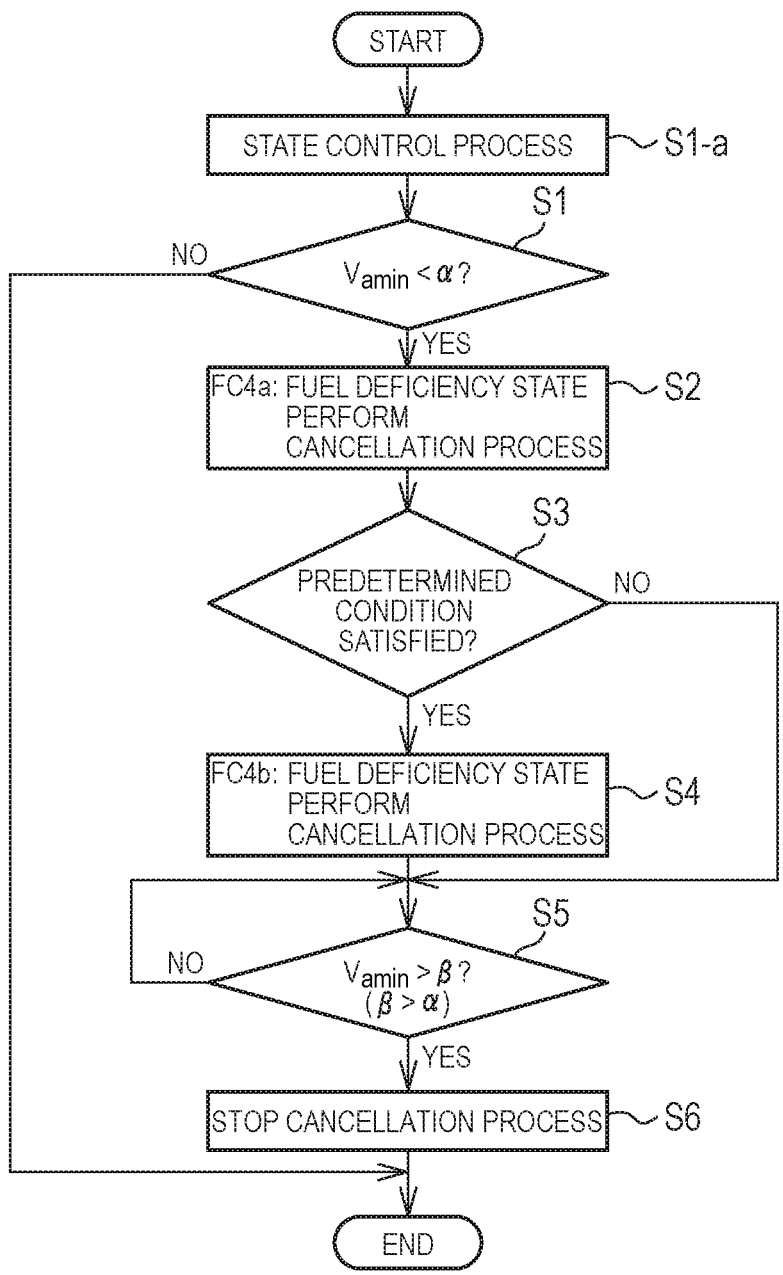

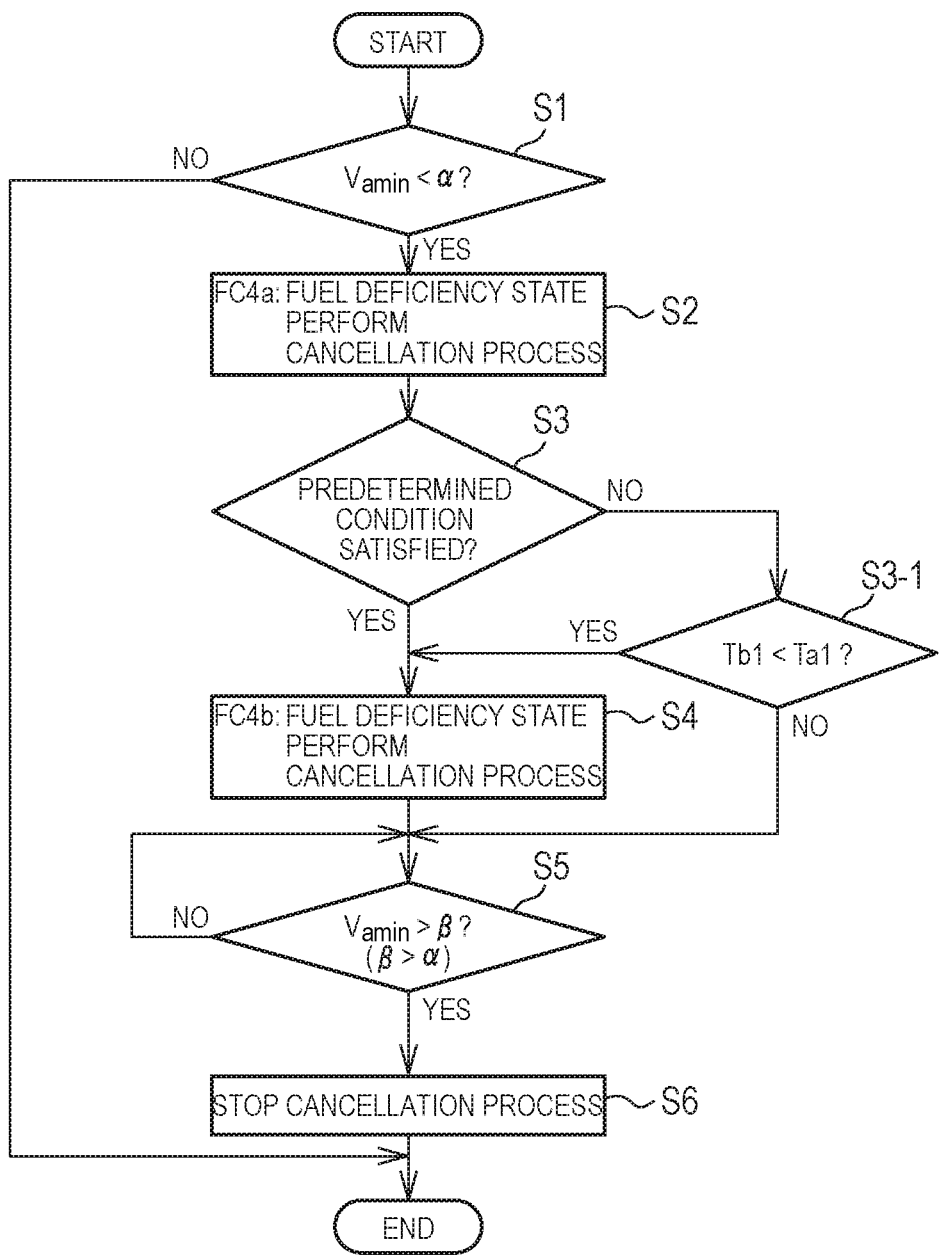

FUEL CELL SYSTEM

INCORPORATION BY REFERENCE

The disclosure of Japanese Patent Application No. 2019-113177 filed on Jun. 18, 2019 including the specification, drawings and abstract is incorporated herein by reference in its entirety.

BACKGROUND

1. Technical Field

The disclosure relates to a fuel cell system.

2. Description of Related Art

In a fuel cell having a plurality of unit cells stacked together, when fuel gas is not sufficiently supplied to a part of the unit cells, and each unit cell in this part is placed in a fuel deficiency state, the voltage of the unit cell may be reduced, and the output performance of the fuel cell as a whole may deteriorate (see, for example, Japanese Unexamined Patent Application Publication No. 2006-049259 (JP 2006-049259 A)).

SUMMARY

In the meantime, the fuel cell is equipped with a voltage detector that detects the voltage of the fuel cell for use in control of the fuel cell. The voltage detector, which is used for determining whether any of the unit cells is in a fuel deficiency state, preferably detects the voltage of each of the unit cells.

The manufacturing cost of the voltage detector is higher as the number of unit cells included in each set of the unit cells for which the voltage detector detects the voltage is smaller, and the manufacturing cost is higher when the voltage of the unit cells is detected for each unit cell, as compared with the case where the voltage is detected for every two or more unit cells, or only the voltage of the whole fuel cell is detected. Also, in a fuel cell system having a plurality of fuel cells, it is preferable to install a voltage detector having such a high manufacturing cost, on each of the fuel cells, so as to determine, with high accuracy, whether any of the unit cells is in a fuel deficiency state with respect to each of the fuel cells. In this case, however, the manufacturing cost of the fuel cell system will be increased.

This disclosure provides a fuel cell system that curbs reduction of the accuracy in determination of a fuel deficiency state, while reducing the manufacturing cost.

A fuel cell system according to one aspect of the disclosure includes a first fuel cell to which a fuel gas and an oxidant gas are supplied and which includes a plurality of first unit cells stacked together, a second fuel cell to which a fuel gas and an oxidant gas are supplied and which includes a plurality of second unit cells stacked together, a first voltage detector connected to the first fuel cell, a second voltage detector connected to the second fuel cell, and a controller configured to control the first fuel cell based on a detection result of the first voltage detector, and control the second fuel cell based on a detection result of the second voltage detector. Each of the first unit cells includes a first electrolyte membrane, a first anode catalyst layer provided on a first surface of the first electrolyte membrane, and a first cathode catalyst layer provided on a second surface of the first electrolyte membrane. Each of the second unit cells includes a second electrolyte membrane, a second anode catalyst layer provided on a first surface of the second electrolyte membrane, and a second cathode catalyst layer provided on a second surface of the second electrolyte membrane. The first electrolyte membrane and the second electrolyte membrane are made of the same material, and have substantially the same thickness, and the first anode catalyst layer and the second anode catalyst layer are made of the same material, and have substantially the same amount per unit area, while the first cathode catalyst layer and the second cathode catalyst layer are made of the same material, and have substantially the same amount per unit area. The first voltage detector is configured to detect voltage of the first unit cells for every "N" unit cells on average, and the second voltage detector is configured to detect voltage of the second fuel cell as a whole, or detect voltage of the second unit cells for every "M" unit cells on average, where "M" represents a number that is larger than "N". The controller is configured to determine whether any of the second unit cells is in a fuel deficiency state, based on the detection result of the first voltage detector, when a predetermined condition under which states of the first fuel cell and the second fuel cell are regarded as being close to each other is satisfied.

In the above fuel cell system, the predetermined condition may include a condition that a difference between a temperature of the first fuel cell and that of the second fuel cell is smaller than a predetermined value.

In the above fuel cell system, the predetermined condition may include a condition that a difference between a stoichiometric ratio of the fuel gas supplied to the first fuel cell and that of the fuel gas supplied to the second fuel cell is smaller than a predetermined value.

In the above fuel cell system, the predetermined condition may include a condition that a difference between a pressure in a first fuel gas channel through which the fuel gas flows in the first fuel cell and a pressure in a second fuel gas channel through which the fuel gas flows in the second fuel cell is smaller than a predetermined value.

In the above fuel cell system, the predetermined condition may include a condition that a difference between a stoichiometric ratio of the oxidant gas supplied to the first fuel cell and that of the oxidant gas supplied to the second fuel cell is smaller than a predetermined value.

In the above fuel cell system, the predetermined condition may include a condition that a difference between a flow rate of coolant that flows in the first fuel cell and that of coolant that flows in the second fuel cell is smaller than a predetermined value.

In the above fuel cell system, the predetermined condition may include a condition that a difference between an output current density of each of the first unit cells and that of each of the second unit cells is smaller than a predetermined value.

In the above fuel cell system, the controller may be configured to perform a cancellation process to cancel the fuel deficiency state, on the second fuel cell, when the controller determines that any of the second unit cells is in the fuel deficiency state.

In the above fuel cell system, the controller may be configured to determine whether any of the first unit cells is in the fuel deficiency state, based on the detection result of the first voltage detector.

In the above fuel cell system, the controller may be configured to perform a cancellation process to cancel the fuel deficiency state, on the first fuel cell, when the controller determines that any of the first unit cells is in the fuel deficiency state.

In the above fuel cell system, the controller may be configured to perform the cancellation process on the second fuel cell, before performing the cancellation process on the first fuel cell, when the controller determines that any of the second unit cells is in the fuel deficiency state.

In the above fuel cell system, the controller may be configured to determine whether any of the second unit cells is in the fuel deficiency state, before determining whether any of the first unit cells is in the fuel deficiency state, in at least one of the case where a voltage parameter correlated with a voltage of the second fuel cell indicates that the voltage of the second fuel cell is lower than a predetermined threshold value, and the case where a temperature parameter correlated with a temperature of the second fuel cell indicates that the temperature of the second fuel cell is lower than a predetermined threshold value. The controller may be configured to perform the cancellation process on the second fuel cell, before performing the cancellation process on the first fuel cell, when the controller determines that any of the second fuel cells is in the fuel deficiency state.

In the above fuel cell system, the controller may be configured to determine whether any of the second unit cells is in the fuel deficiency state, based on the detection result of the first voltage detector, when the predetermined condition is not satisfied, but a condition indicating a state where any of the second unit cells is more likely to be placed in the fuel deficiency state than any of the first unit cells is satisfied.

In the above fuel cell system, the first unit cells and the second unit cells may be the same members.

The disclosure provides the fuel cell system that curbs reduction of the accuracy in determination of the fuel deficiency state, while reducing the manufacturing cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart showing a fourth modified example of the fuel deficiency determination control;

FIG. 9 is a flowchart showing a fifth modified example of the fuel deficiency determination control;

DETAILED DESCRIPTION OF EMBODIMENTS

General Configuration of Fuel Cell System

Figure 1:
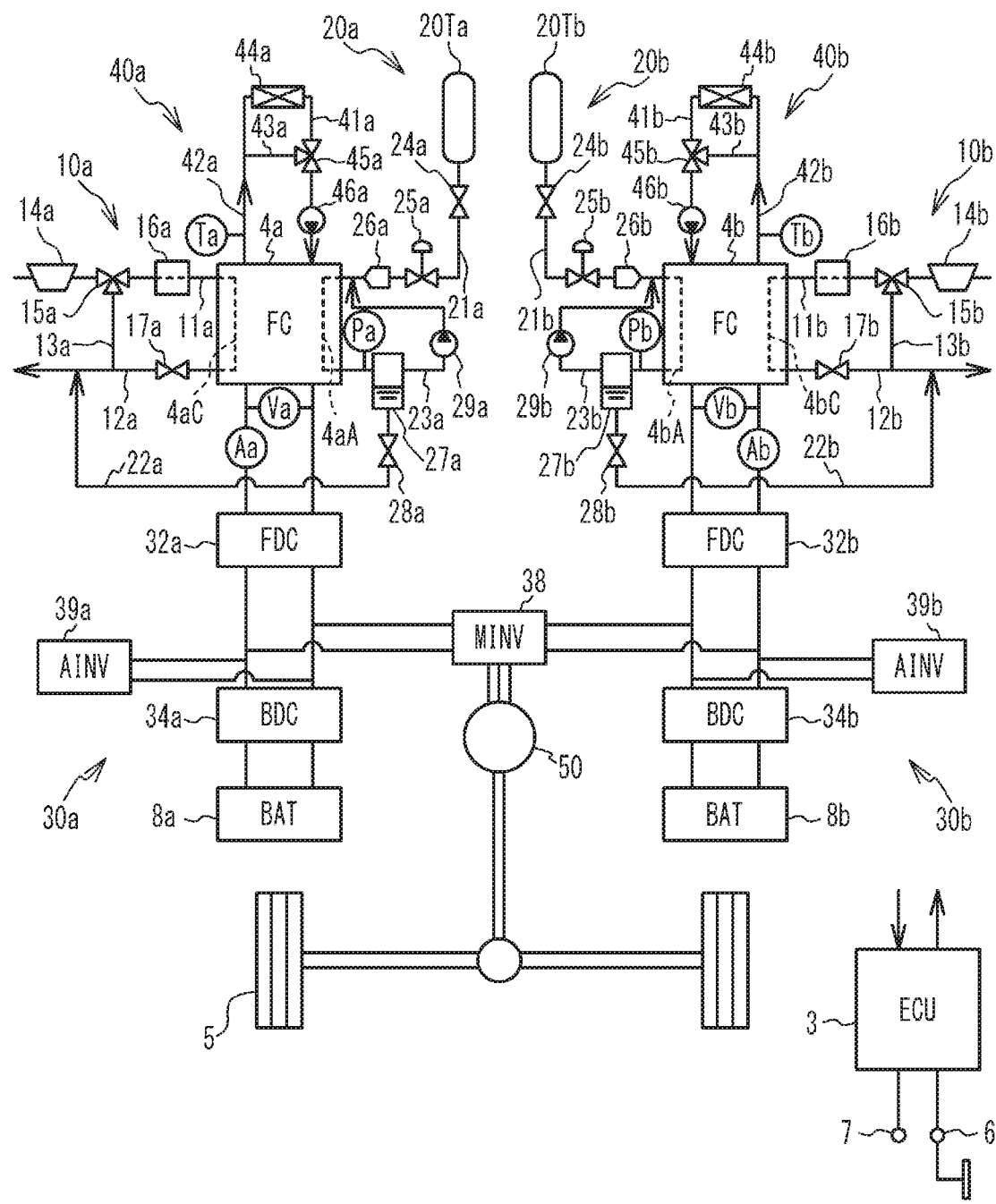
FIG. 1 is a view showing the configuration of a fuel cell system installed on a vehicle.

FIG. 1 shows the configuration of a fuel cell system 1 installed on a vehicle. The fuel cell system 1 includes an electronic control unit (ECU) 3 (controller), fuel cell (which will be referred to as "FC") 4a (first fuel cell), fuel cell 4b (second fuel cell), secondary batteries (each of which will be referred to as "BAT") 8a, 8b, oxidant gas supply systems 10a, 10b, fuel gas supply systems 20a, 20b, power control systems 30a, 30b, and cooling systems 40a, 40b. Also, the vehicle includes a motor 50 for propelling the vehicle, wheels 5, and accelerator pedal position sensor 6.

The FCs 4a, 4b are fuel cells that generate electric power when they are supplied with fuel gas and oxidant gas. Each of the FCs 4a, 4b is in the form of a stack of a plurality of unit cells of solid polymer electrolyte type. A cathode channel 4aC, 4bC through which the oxidant gas flows, and an anode channel 4aA, 4bA through which the fuel gas flows, are formed in each of the FCs 4a, 4b. The unit cell includes a membrane electrode gas diffusion layer assembly (which will be referred to as "MEGA"), and a pair of separators that sandwich the assembly. The anode channel 4aA includes an anode inlet manifold and an anode outlet manifold, which extend through the separators of the unit cells, and space provided in each unit cell, between one of the separators located on the anode side of the MEGA, and the MEGA. The cathode channel 4aC includes a cathode inlet manifold and a cathode outlet manifold, which extend through the separators of the unit cells, and space provided in each unit cell, between the other separator located on the cathode side of the MEGA, and the MEGA. The FC 4a and the FC 4b are examples of the first fuel cell and the second fuel cell, respectively.

The oxidant gas supply systems 10a, 10b supply air including oxygen as oxidant gas, to the FCs 4a, 4b, respectively. More specifically, each of the oxidant gas supply systems 10a, 10b includes a supply pipe 11a, 11b, discharge pipe 12a, 12b, bypass pipe 13a, 13b, air compressor 14a, 14b, bypass valve 15a, 15b, intercooler 16a, 16b, and back pressure valve 17a, 17b.

The supply pipe 11a, 11b is connected to the cathode inlet manifold of the corresponding FC 4a, 4b. The discharge pipe 12a, 12b is connected to the cathode outlet manifold of the corresponding FC 4a, 4b. The bypass pipe 13a communicates with the supply pipe 11a and the discharge pipe 12a, and, similarly, the bypass pipe 13b communicates with the supply pipe 11b and the discharge pipe 12b. The bypass valve 15a is provided in a connecting portion of the supply pipe 11a and the bypass pipe 13a, and, similarly, the bypass valve 15b is provided in a connecting portion of the supply pipe 11b and the bypass pipe 13b. The bypass valve 15a switches a state of communication between the supply pipe 11a and the bypass pipe 13a, and, similarly, the bypass valve 15b switches a state of communication between the supply pipe 11b and the bypass pipe 13b. The air compressor 14a, bypass valve 15a, and intercooler 16a are arranged in this order from the upstream side on the supply pipe 11a. A back pressure valve 17a is provided on the discharge pipe 12a, and located upstream of a connecting portion of the discharge pipe 12a and the bypass pipe 13a. Similarly, the air compressor 14b, bypass valve 15b, and intercooler 16b are arranged in this order from the upstream side on the supply pipe 11b. A back pressure valve 17b is provided on the discharge pipe 12b, and located upstream of a connecting portion of the discharge pipe 12b and the bypass pipe 13b.

The air compressors 14a, 14b supply air including oxygen as oxidant gas, to the FCs 4a, 4b, via the supply pipes 11a, 11b, respectively. The oxidant gas supplied to the FCs 4a, 4b chemically reacts with fuel gas in the FCs 4a, 4b, to generate electricity, and is then discharged via the discharge pipes 12a, 12b, respectively. The intercoolers 16a, 16b cool the oxidant gas supplied to the FCs 4a, 4b, respectively. The back pressure valves 17a, 17b adjust the cathode-side back pressures of the FCs 4a, 4b, respectively.

The fuel gas supply systems 20a, 20b supply hydrogen gas as fuel gas to the FCs 4a, 4b, respectively. More specifically, each of the fuel gas supply systems 20a, 20b includes a tank 20Ta, 20Tb, supply pipe 21a, 21b, discharge pipe 22a, 22b, pressure sensor Pa, Pb, circulation pipe 23a, 23b, tank valve 24a, 24b, pressure regulating valve 25a, 25b, injector (which will be referred to as "INJ") 26a, 26b, gas-liquid separator 27a, 27b, drain valve 28a, 28b, and hydrogen circulation pump (which will be referred to as "HP") 29a, 29b, respectively.

The tank 20Ta and the anode inlet manifold of the FC 4a are connected by the supply pipe 21a. Similarly, the tank 20Tb and the anode inlet manifold of the FC 4b are connected by the supply pipe 21b. Hydrogen gas as the fuel gas is stored in the tanks 20Ta, 20Tb. Each of the discharge pipes 22a, 22b is connected at one end to the anode outlet manifold of the corresponding FC 4a, 4b, and is connected at the other end to the discharge pipe 12a, 12b of the corresponding oxidant gas supply system 10a, 10b. The circulation pipes 23a, 23b communicate with the gas-liquid separators 27a, 27b and the supply pipes 21a, 21b, respectively. The tank valve 24a, pressure regulating valve 25a, and INJ 26a are arranged in this order from the upstream side of the supply pipe 21a. In a condition where the tank valve 24a is open, the opening of the pressure regulating valve 25a is adjusted, and the fuel gas is injected from the INJ 26a. As a result, the fuel gas is supplied to the FC 4a. The tank valve 24a, pressure regulating valve 25a, and INJ 26a are driven, under control of the ECU 3. The tank valve 24b, pressure regulating valve 25b, and INJ 26b are located similarly, and operate in the same manner.

On the discharge pipe 22a, the pressure sensor Pa, gas-liquid separator 27a, and drain valve 28a are arranged in this order from the upstream side thereof. The pressure sensor Pa is provided in the vicinity of the anode outlet manifold of the FC 4a, and detects the pressure at the outlet side of the anode channel 4aA of the FC 4a. The gas-liquid separator 27a separates water from the fuel gas discharged from the FC 4a, and stores the water. When the drain valve 28a is opened, the water stored in the gas-liquid separator 27a is discharged to the outside of the fuel cell system 1, via the discharge pipes 22a, 12a. The drain valve 28a is driven under control of the ECU 3. Similarly, the pressure sensor Pb is provided in the vicinity of the anode outlet manifold of the FC 4b, and detects the pressure at the outlet side of the anode channel 4bA of the FC 4b. The gas-liquid separator 27b and the drain valve 28b are located and operate similarly to the gas-liquid separator 27a and the drain valve 28a, respectively.

The circulation pipe 23a permits the fuel gas to be circulated into the FC 4a, and its upstream end portion is connected to the gas-liquid separator 27a, while the HP 29a is located on the circulation pipe 23a. The fuel gas discharged from the FC 4a is adequately pressurized by the HP 29a, and fed to the supply pipe 21a. The HP 29a is driven under control of the ECU 3. The circulation pipe 23b and the HP 29b are located and operate similarly to the circulation pipe 23a and the HP 29a, respectively.

The cooling systems 40a, 40b cool the FCs 4a, 4b, respectively, by circulating coolant via predetermined routes. Each of the cooling systems 40a, 40b includes a supply pipe 41a, 41b, discharge pipe 42a, 42b, bypass pipe 43a, 43b, radiator 44a, 44b, bypass valve 45a, 45b, water pump (which will be referred to as "WP") 46a, 46b, and temperature sensor Ta, Tb.

The supply pipe 41a is connected to a coolant inlet manifold of the FC 4a. The discharge pipe 42a is connected to a coolant outlet manifold of the FC 4a. The bypass pipe 43a communicates with the supply pipe 41a and the discharge pipe 42a. The bypass valve 45a is provided in a connection portion of the supply pipe 41a and the bypass pipe 43a. The bypass valve 45a switches a state of communication between the supply pipe 41a and the bypass pipe 43a. The radiator 44a is connected to the supply pipe 41a and the discharge pipe 42a. The bypass valve 45a and the WP 46a are arranged in this order from the upstream side on the supply pipe 41a. The WP 46a circulates coolant, between the FC 4a and the radiator 44a, via the supply pipe 41a and the discharge pipe 42a. The radiator 44a cools the coolant discharged from the FC 4a, by exchanging heat with the outside air. The bypass valve 45a and the WP 46a are driven, under control of the ECU 3. A temperature sensor Ta, which is provided on the discharge pipe 42a, detects the temperature of the coolant discharged from the FC 4a, and the ECU 3 obtains the detection result of the temperature sensor Ta. The supply pipe 41b, discharge pipe 42b, bypass pipe 43b, radiator 44b, bypass valve 45b, WP 46b, and temperature sensor Tb of the cooling system 40b are located and operate similarly to those of the cooling system 40a.

Each of the power control systems 30a, 30b includes a fuel cell DC/DC converter (which will be referred to as "FDC") 32a, 32b, battery DC/DC converter (which will be referred to as "BDC") 34a, 34b, accessories inverter (which will be referred to as "AINV") 39a, 39b, voltage sensor Va (first voltage detector) or voltage sensor Vb (second voltage detector), and current sensor Aa, Ab. Also, the power control systems 30a, 30b share a motor inverter (which will be referred to as "MINV") 38 connected to the motor 50. The FDCs 32a, 32b adjust DC power from the FCs 4a, 4b, respectively, and deliver the resulting power to the MINV 38. The BDCs 34a, 34b adjust DC power from the BATs 8a, 8b, respectively, and deliver the resulting power to the MINV 38. Electric power generated by the FCs 4a, 4b can be stored in the BATs 8a, 8b, respectively. The MINV 38 converts the received DC power into three-phase AC power, and supplies the power to the motor 50. The motor 50 drives the wheels 5, and causes the vehicle to travel.

The FC 4a and the BAT 8a can supply electric power to load devices other than the motor 50, via the AINV 39a. Similarly, the FC 4b and the BAT 8b can supply electric power to load devices via the AINV 39b. The load devices include accessories for the FCs 4a, 4b, and accessories for the vehicle. The accessories for the FCs 4a, 4b include the air compressors 14a, 14b, bypass valves 15a, 15b, back pressure valves 17a, 17b, tank valves 24a, 24b, pressure regulating valves 25a, 25b, INJs 26a, 26b, drain valves 28a, 28b, and HPs 29a, 29b. The accessories for the vehicle include, for example, an air conditioner, lighting devices, hazard lights, and so forth.

The current sensor Aa and the voltage sensor Va are connected to the FC 4a, and the current sensor Ab and the voltage sensor Vb are connected to the FC 4b. The current sensors Aa, Ab detect output currents of the FCs 4a, 4b, respectively, and the ECU 3 obtains the detection results. The voltage sensor Va detects a voltage of each unit cell of the FC 4a, and the ECU 3 obtains the detection result. The voltage sensor Vb detects a voltage of the whole FC 4b, and the ECU 3 obtains the detection result. The current sensor Aa and voltage sensor Va, and the current sensor Ab and voltage sensor Vb are used for controlling operation of the FCs 4a, 4b, respectively. For example, the ECU 3 obtains current-voltage characteristics of the FC 4a, based on the detection results of the current sensor Aa and voltage sensor Va, and sets a target current value of the FC 4a, referring to the current-voltage characteristics of the FC 4a, so that the actual output of the FC 4a becomes equal to the required output of the FC 4a. Then, the ECU 3 controls the FDC 32a so as to control a sweep current value of the FC 4a to the target current value. While the voltage sensor Va detects the voltage of each unit cell of the FC 4a, the ECU 3 calculates the voltage of the whole FC 4a by adding up voltages of the respective unit cells, and obtains the current-voltage characteristics of the FC 4a, based on the result of calculation. Similarly, the ECU 3 obtains current-voltage characteristics of the FC 4b, from the relationship between the output current and output voltage of the FC 4b, based on the detection results of the current sensor Ab and voltage sensor Vb, and sets a target current value of the FC 4b, referring to the current-voltage characteristics of the FC 4b, so that the actual output of the FC 4b becomes equal to the required output of the FC 4b. Then, the ECU 3 controls the FDC 32b, so as to control a sweep current value of the FC 4b to the target current value. In this manner, the ECU 3 controls the FCs 4a, 4b, based on the detection results of the voltage sensors Va, Vb. The voltage sensors Va, Vb are examples of the first and second voltage detectors, respectively, and will be described in detail later.

The ECU 3 includes a central processing unit (CPU), read-only memory (ROM), and a random access memory (RAM). The accelerator pedal position sensor 6, ignition switch 7, air compressors 14a, 14b, bypass valves 15a, 15b, back pressure valves 17a, 17b, tank valves 24a, 24b, pressure regulating valves 25a, 25b, INJs 26a, 26b, drain valves 28a, 28b, FDCs 32a, 32b, and BDCs 34a, 34b are electrically connected to the ECU 3. The ECU 3 calculates the required output P of the FCs 4a, 4b as a whole, based on a detected value of the accelerator pedal position sensor 6, and drive conditions of the accessories for the vehicle and accessories for the FCs 4a, 4b, electric power stored in the BATs 8a, 8b, etc. Also, the ECU 3 controls the accessories for the FCs, 4a, 4b, etc., according to the required output P, so as to control the total electric power generated by the FCs 4a, 4b. The required output P is output required to be generated by a fuel cell unit that consists of two or more fuel cells, and does not include output required to be generated by the BATs 8a, 8b, etc. other than the fuel cells.

Voltage Sensors Va and Vb

Figure 2A:
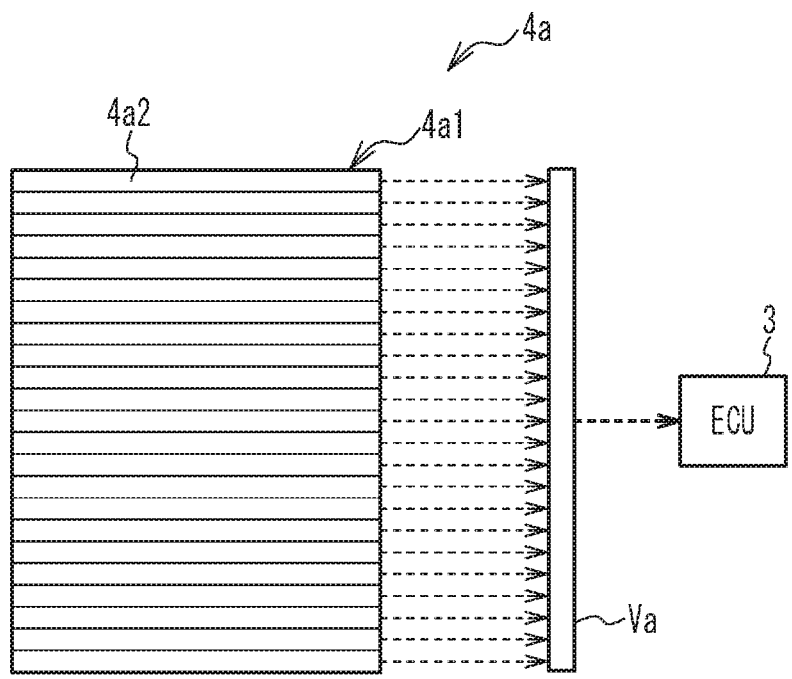
FIG. 2A is an explanatory view of a voltage sensor.
Figure 2B:
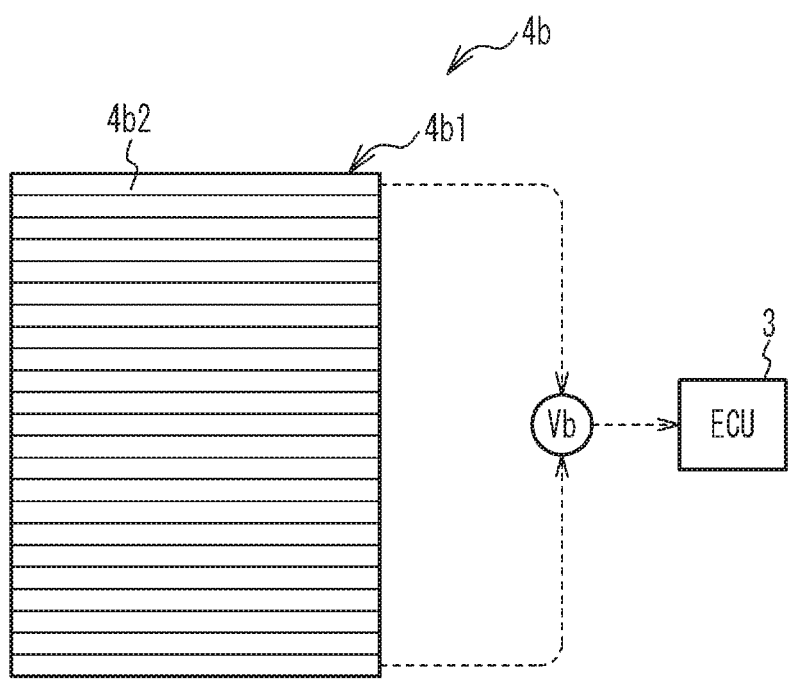
FIG. 2B is an explanatory view of another voltage sensor.

FIG. 2A and FIG. 2B show the voltage sensors Va, Vb, respectively. Initially, the FC 4a and the FC 4b will be described. The FC 4a has a plurality of unit cells 4a2 (first unit cells) that are laminated into a stack 4a1. At one end of the stack 4a1, a terminal plate, insulator, and end plate (not shown) are laminated in this order from the stack 4a1 side. Similarly, at the other end of the stack 4a1, a terminal plate, insulator and end plate are laminated in this order from the stack 4a1 side. The FC 4a includes these members. Similarly, the FC 4b has a plurality of unit cells 4b2 (second unit cells) that are laminated into a stack 4b1, and further has two terminal plates, two insulators, and two end plates. The unit cell 4a2 is identical with the unit cell 4b2. Also, the total number of the stacked unit cells 4a2 is equal to that of the unit cells 4b2.

The voltage sensor Va detects the voltage for each unit cell, with respect to all of the unit cells 4a2 of the FC 4a. Namely, the number of detection channels of the voltage sensor Va is equal to the total number of the stacked unit cells 4a2. On the other hand, the voltage sensor Vb detects the voltage of the whole stack 4b1, namely, the voltage of the whole FC 4b. Accordingly, the number of detection channels of the voltage sensor Vb is one. Thus, the number of detection channels of the voltage sensor Vb is smaller than that of the voltage sensor Va; therefore, the manufacturing cost of the voltage sensor Vb is lower than that of the voltage sensor Va. Accordingly, the manufacturing cost of the fuel cell system 1 of this embodiment is reduced, as compared with the case where the FC 4b is also provided with a voltage sensor that detects the voltage of each of the unit cells 4b2, like the FC 4a.

Unit Cell 4a2, 4b2

Figure 3A:
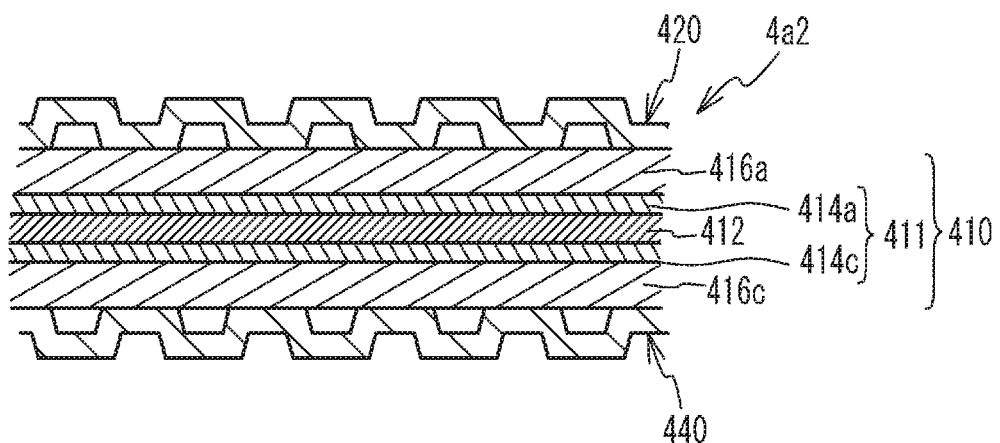
FIG. 3A is a schematic cross-sectional view of a part of a unit cell.
Figure 3B:
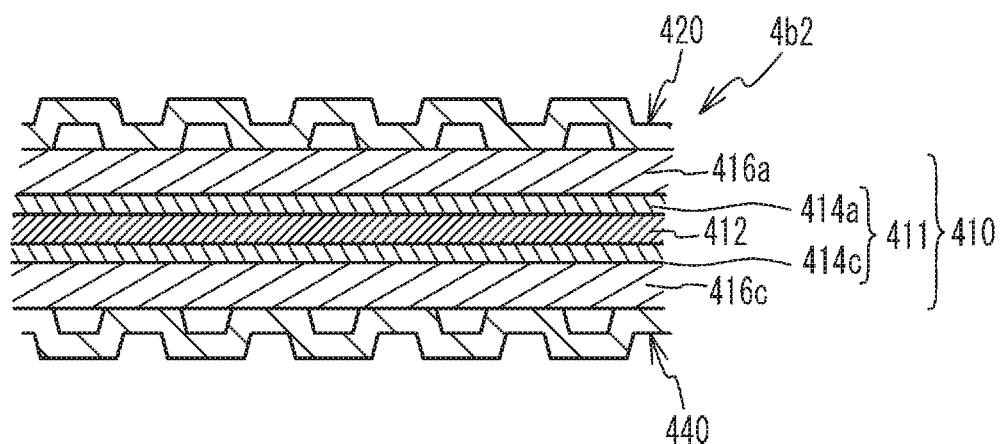
FIG. 3B is a schematic cross-sectional view of a part of another unit cell.

FIG. 3A is a schematic cross-sectional view of a part of the unit cell 4a2, and FIG. 3B is a schematic cross-sectional view of a part of the unit cell 4b2. As shown in FIG. 3A, the unit cell 4a2 has a membrane electrode gas diffusion layer assembly (which will be referred to as "MEGA") 410, and an anode separator (which will be referred to as "separator") 420 and a cathode separator (which will be referred to as "separator") 440 that sandwich the MEGA 410 therebetween. The MEGA 410 has diffusion layers 416a, 416c, and a membrane electrode assembly (which will be referred to as "MEA") 411. The MEA 411 includes an electrolyte membrane 412, anode catalyst layer 414a formed on one surface (first surface) of the electrolyte membrane 412, and cathode catalyst layer 414c formed on the other surface (second surface) of the electrolyte membrane 412. The electrolyte membrane 412 is a solid polymer thin membrane showing good proton conductivity in a wet state, and is, for example, a fluorine-based ion exchange membrane. The catalyst layers 414a, 414c are formed by coating the electrolyte membrane 412, with catalyst ink including a carbon support that supports platinum (Pt), etc., and ionomer having proton conductivity, for example. The diffusion layers 416a, 416c are formed of a material having gas permeability and conductivity, for example, a porous fiber base material, such as carbon fiber or graphite fiber. The diffusion layers 416a, 416c are joined to the catalyst layers 414a, 414c, respectively.

The separators 420, 440 are formed with a plurality of manifolds that permit the fuel gas, oxidant gas, and coolant to be introduced and discharged. Also, each of the separators 420, 440 is provided with a plurality of grooves such that the grooves are open to opposite surfaces of the separator. The grooves of the separator 420 closer to the diffusion layer 416a provide a part of the anode channel 4aA, and the grooves of the separator 440 closer to the diffusion layer 416c provide a part of the cathode channel 4aC. Also, the grooves of the separator 420 remote from the diffusion layer 416a, and the grooves of the separator 440 remote from the diffusion layer 416c, provide a part of the coolant channel.

As shown in FIG. 3B, the unit cell 4b2 is identical with the unit cell 4a2, namely, each of the unit cell 4a2 and the unit cell 4b2 is comprised of the same components. Thus, the same reference numerals are assigned to the corresponding components. Namely, the electrolyte membrane 412 of the unit cell 4a2 has the same material, thickness, and size as measured in the direction of its plane, as that of the unit cell 4b2. Also, the catalyst layer 414a of the unit cell 4a2 has the same material, amount per unit area, and size as measured in the direction of its plane, as that of the unit cell 4b2. The catalyst layer 414c of the unit cell 4a2 has the same material, amount per unit area, and size as measured in the direction of its plane, as that of the unit cell 4b2. Also, the diffusion layer 416a of the unit cell 4a2 has the same material, thickness, shape, and size as measured in the direction of its plane, as that of the unit cell 4b2. The diffusion layer 416c of the unit cell 4a2 also has the same material, thickness, shape, and size as measured in the direction of its plane, as that of the unit cell 4b2. The separator 420 of the unit cell 4a2 has the same material, shape, and size as that of the unit cell 4b2. The separator 440 of the unit cell 4a2 has the same material, shape, and size as that of the unit cell 4b2. Namely, the unit cells 4a2, 4b2 can be regarded as having the same output performance.

Fuel Deficiency State

Next, a fuel deficiency state will be described. For example, the FC 4a may be placed in a fuel deficiency state in which fuel gas is not sufficiently supplied to any of the unit cells 4a2, even when the fuel gas is supplied from the INJ 26a to the FC 4a. For example, the FC 4a is placed in the fuel deficiency state, when liquid water generated by power generation reaction remains in the anode channel 4aA, and the fuel gas is not sufficiently supplied to at least a part of a power generating region or regions of a part of the unit cells 4a2. Also, when liquid water remaining in the anode channel 4aA of the FC 4a freezes, due to reduction of the outside air temperature while the fuel cell system 1 is stopped, and the fuel gas is not sufficiently supplied to at least a part of the power generating region or regions of a part of the unit cells 4a2, due to the frozen water, or ice, even after starting of the fuel cell system 1, the unit cell or cells 4a2 are placed in the fuel deficiency state. The voltage of the unit cell 4a2 placed in the fuel deficiency state is reduced to be lower than the originally scheduled voltage, and the power generation efficiency deteriorates. Further, if the fuel deficiency state continues, carbon that supports the anode catalyst of the unit cell 4a2 and carbon that supports the cathode catalyst may undergo oxidation corrosion, and the anode catalyst and the cathode catalyst may be eluted, which may result in deterioration of the power generation performance In this connection, when there is a deficiency of the oxidant gas supplied to the unit cells 4a2, the power generation performance is only temporarily reduced. However, when there is a deficiency of the fuel gas as described above, the subsequent power generation performance may be permanently reduced; thus, it is necessary to more appropriately detect the deficiency of the fuel gas, compared to the deficiency of the oxidant gas. The unit cells 4b2 of the FC 4b may also be placed in the fuel deficiency state according to the same principle, and the same problem may occur.

Thus, in this embodiment, the ECU 3 causes the voltage sensor Va to detect the voltage of each unit cell 4a2 of the FC 4a, and determines whether any of the unit cells 4a2 is in the fuel deficiency state, based on the detection result of the voltage sensor Va. When the ECU 3 determines that any of the unit cells 4a2 is in the fuel deficiency state, it performs a cancellation process for cancelling the fuel deficiency state, on the FC 4a. Since the voltage sensor Va connected to the FC 4a detects the voltage of each of the unit cells 4a2, as described above, the ECU 3 can highly accurately detect reduction of the voltage of any of the unit cells 4a2, and determine, with high accuracy, whether the unit cell 4a2 is in the fuel deficiency state.

The unit cells 4b2 of the FC 4b may also be placed in the fuel deficiency state as described above. However, since the voltage sensor Vb connected to the FC 4b detects the voltage of the whole FC 4b, reduction of the voltage of any of the unit cells 4b2, when it is placed in a fuel deficiency state, is not sufficiently reflected by the voltage of the whole stack 4b1. Thus, it is difficult to determine, with high accuracy, whether any of the unit cells 4b2 is in the fuel deficiency state, based on the detection result of the voltage sensor Vb. In this embodiment, the ECU 3 performs fuel deficiency determination control to determine whether any of the unit cells 4b2 is in the fuel deficiency state, based on the detection result of the voltage sensor Va, rather than the voltage sensor Vb.

Fuel Deficiency Determination Control

Figure 4:
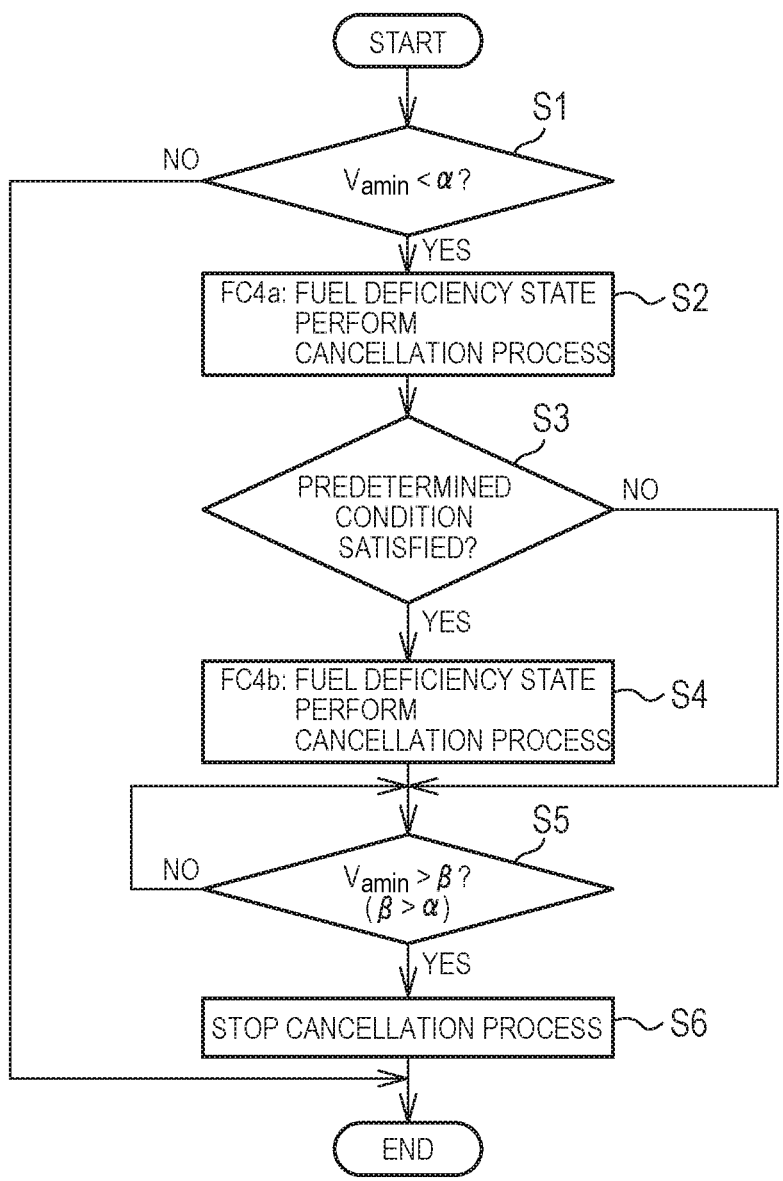
FIG. 4 is a flowchart showing one example of fuel deficiency determination control of one embodiment.

FIG. 4 is a flowchart illustrating one example of fuel deficiency determination control of this embodiment. The control routine of FIG. 4 is repeatedly executed. Initially, the ECU 3 determines whether the minimum value $V_{amin}$ of respective voltages of the unit cells 4a2 is smaller than a threshold value $\alpha$, based on the detection result of the voltage sensor Va (step S1). The threshold value $\alpha$ is a voltage value based on which the unit cell 4a2 concerned can be regarded as being in a fuel deficiency state, and is smaller than the lower limit of voltage to which the voltage of the unit cell 4a2 would not be positively controlled when the FC 4a is in a normal operating state during power generation.

The threshold value $\alpha$ is equal to 0.1 V, for example, but is not limited to this value. For example, the threshold value $\alpha$ may be equal to or higher than −0.2 V, and lower than 0.2 V, and, preferably, is equal to or higher than 0 V, and lower than 0.15 V. The reason why the threshold value $\alpha$ is equal to or higher than −0.2 V is as follows: when the voltage of a certain unit cell 4a2 becomes equal to or lower than −0.2 V, elution of the anode catalyst or cathode catalyst of the unit cell 4a2 progresses largely, and the output performance of the unit cell 4a2 may be subsequently reduced. It is preferable that the threshold value $\alpha$ is equal to or higher than 0 V, because reduction of the power generation efficiency can be curbed, if the cancellation process for cancelling the fuel deficiency state as described later is performed, before the voltage of the unit cell 4a2 that is in the fuel deficiency state reaches a negative voltage. The threshold value is set to be lower than 0.2 V, because, if the threshold value is set to a value that is larger than the preset lower limit of voltage of the unit cells 4a2, the ECU 3 may determine that any of the unit cells 4a2 is in a fuel deficiency state, even though it is in a normal state. The threshold value $\alpha$ is preferably lower than 0.15 V, for the reason as follows. When liquid water temporarily remains in the anode channel 4aA, the voltage of any of the unit cells 4a2 is reduced, and the unit cell 4a2 is temporarily placed in a fuel deficiency state. However, the remaining liquid water may be immediately discharged due to change in the operating state of the FC 4a, and the fuel deficiency state may be immediately cancelled.

When a negative decision (NO) is obtained in step S1, the ECU 3 determines that none of the unit cells 4a2 of the FC 4a is in the fuel deficiency state, and the current cycle of the control routine ends. When an affirmative decision (YES) is obtained in step S1, the ECU 3 determines that any of the unit cells 4*a*2 of the FC 4*a* is in the fuel deficiency state, and the cancellation process for cancelling the fuel deficiency state is performed on the FC 4*a* (step S2). Namely, the situation where the minimum value $V_{amin}$ is smaller than the threshold value α indicates that the degree of reduction of the voltage of the unit cell 4*a*2 having the minimum value $V_{amin}$ is so large that it can be determined that the unit cell 4*a*2 is in the fuel deficiency state.

Cancellation Process

The cancellation process performed on the FC 4*a* includes a drainage promotion process for promoting drainage of liquid water from the FC 4*a*, and a temperature elevation process for raising the temperature of the FC 4*a*.

The drainage promotion process is a process for cancelling a fuel deficiency state caused by liquid water remaining in the anode channel 4*a*A, by promoting discharge of liquid water remaining in the anode channel 4*a*A. The drainage promotion process on the FC 4*a* includes, for example, at least one of (a) operation to increase the valve-opening period of the INJ 26*a* to a longer period than that in a normal operating state, and (b) operation to increase the rotating speed of the HP 29*a* to a higher speed than that in the normal operating state. Through the operation (a), the pressure of the fuel gas injected from the INJ 26*a* increases, and discharge of liquid water remaining in the anode channel 4*a*A can be promoted. The operation (a) can be implemented by increasing the ratio of the valve-opening period of the INJ 26*a* to the overall period as the sum of the valve-opening period and the valve-closing period, to a larger ratio than in the normal operating state. Also, through the operation (b), the pressure of the fuel gas that circulates through the anode channel 4*a*A increases, and discharge of liquid water from the anode channel 4*a*A can be promoted. Both the operation (a) and operation (b) may be carried out.

The temperature elevation process is a process for cancelling a fuel deficiency state, by raising the temperature of the FC 4*a* so as to promote evaporation of liquid water remaining in the anode channel 4*a*A, or promote melting of ice present in the anode channel 4*a*A. The temperature elevation process on the FC 4*a* includes, for example, at least one of (c) operation to reduce the power generation efficiency of the FC 4*a* by reducing the stoichiometric ratio of the oxidant gas supplied to the FC 4*a* to a lower ratio than that in the normal operating state, (d) operation to reduce the flow rate of coolant that circulates through the FC 4*a* or stop flow of the coolant, by reducing the rotating speed of the WP 46*a* to a lower speed than that in the normal operating state or stopping the WP 46*a*, and (e) operation to reduce the flow rate of coolant that flows through the radiator 44*a* to a smaller rate than that in the normal operating state, by controlling the opening of the bypass valve 45*a*. Through the operation (c), the amount of heat generated in the FC 4*a* is increased, and the temperature of the FC 4*a* can be elevated. The "stoichiometric ratio" indicates the ratio of the amount of reaction gas supplied, to the theoretical amount of reaction gas determined based on the required amount of electric power to be generated. Through the operation (d), the cooling efficiency of the FC 4*a* is reduced, and the temperature of the FC 4*a* can be elevated. Through the operation (e), the temperature of the coolant can be raised, and the temperature of the FC 4*a* can be elevated. Two or more of the operations (c), (d), (e) may be carried out at the same time.

When the outside air temperature is equal to or higher than 0° C., and a predetermined time has elapsed from starting of the fuel cell system 1, fuel deficiency is supposed to be caused by liquid water remaining in the anode channel 4*a*A, and the drainage promotion process may be carried out as the cancellation process. When the outside temperature is lower than 0° C., and the predetermined time has not elapsed from starting of the fuel cell system 1, fuel deficiency is supposed to be caused by ice present in the anode channel 4*a*A, and the temperature elevation process may be carried out as the cancellation process. Also, the drainage promotion process and temperature elevation process may be carried out at the same time.

Referring again to the flowchart of FIG. 4, the ECU 3 determines whether a "predetermined condition" under which the states of the FC 4*a* and FC 4*b* can be regarded as being close to each other is satisfied (step S3). The predetermined condition will be described in detail later. When an affirmative decision (YES) is obtained in step S3, the ECU 3 determines that any of the unit cells 4*b*2 of the FC 4*b* is in a fuel deficiency state, and the cancellation process for cancelling the fuel deficiency state is performed on the FC 4*b* (step S4). Specific operation performed on the FC 4*b* as the cancellation process is the same as the above operation performed on the FC 4*a* as the cancellation process. Namely, the same operation or operations, out of the above operations (a) to (e), are performed on both the FC 4*a* and the FC 4*b*. When a negative decision (NO) is obtained in step S3, the ECU 3 does not execute step S4.

Then, the ECU 3 determines whether the minimum value $V_{amin}$ is larger than a threshold value β (step S5). The threshold value β is larger than the threshold value α, and is set to a voltage value that is higher by a given margin than the minimum value of voltage values that can be taken by the unit cells 4*a*2 in which the fuel deficiency state has been cancelled. The threshold value β is 0.2 V, for example, but is not limited to this value. When a negative decision (NO) is obtained in step S5, the ECU 3 determines that the fuel deficiency state has not been sufficiently cancelled, and step S5 is executed again. Namely, the cancellation process is continued.

When an affirmative decision (YES) is obtained in step S5, the ECU 3 determines that the fuel deficiency state has been cancelled, and stops the cancellation process that is being executed (step S6). Namely, when the cancellation process is performed only on the FC 4*a*, the cancellation process on the FC 4*a* is stopped. When the cancellation process is performed on both the FC 4*a* and the FC 4*b*, the cancellation process on the FC 4*a* and the FC 4*b* is stopped. If the fuel deficiency state is cancelled in the unit cells 4*a*2 of the FC 4*a* when the cancellation process is performed on both the FC 4*a* and the FC 4*b*, it can be assumed that the fuel deficiency state is also cancelled in the unit cells 4*b*2 of the FC 4*b*.

As described above, the manufacturing cost is reduced by using the voltage sensor Vb having the lower manufacturing cost than the voltage sensor Va. Also, the ECU 3 determines whether any of the unit cells 4*b*2 of the FC 4*b* is in a fuel deficiency state, based on the detection result of the voltage sensor Va connected to the FC 4*a*, so that the accuracy in determination of the fuel deficiency state of the unit cells 4*b*2 is made less likely or unlikely to be reduced.

Predetermined Condition

Next, the "predetermined condition" in step S3 above will be described. The predetermined condition is a condition or a set of conditions under which the states of the FC 4*a* and FC 4*b* can be regarded as being close to each other, and any of the unit cells 4*b*2 of the FC 4*b* can be regarded as being highly likely to be in a fuel deficiency state when any of the unit cells 4*a*2 of the FC 4*a* is in a fuel deficiency state. The predetermined condition includes at least one of the following conditions that (A) a difference between the temperature of the FC 4*a* and that of the FC 4*b* is smaller than a predetermined value,
(B) a difference between the stoichiometric ratio of the fuel gas supplied to the FC 4*a* and that of the fuel gas supplied to the FC 4*b* is smaller than a predetermined value,
(C) a difference between the pressure in the anode channel 4*a*A (first fuel gas channel) through which the fuel gas flows in the FC 4*a* and the pressure in the anode channel 4*b*A (second fuel gas channel) through which the fuel gas flows in the FC 4*b* is smaller than a predetermined value;
(D) a difference between the stoichiometric ratio of the oxidant gas supplied to the FC 4*a* and that of the oxidant gas supplied to the FC 4*b* is smaller than a predetermined value, and
(E) a difference between the output current (which will be referred to as "output current density") per unit cell 4*a*2 relative to the effective power generation area per unit cell 4*a*2 and the output current (which will be referred to as "output current density") per unit cell 4*b*2 relative to the effective power generation area per unit cell 4*b*2 is smaller than a predetermined value.

As the temperatures of the FC 4*a* and the FC 4*b* are higher, the amounts of liquid water or ice remaining in the anode channels 4*a*A, 4*b*A, respectively, are smaller. Accordingly, when the temperatures of the FCs 4*a*, 4*b* are close to each other, as specified by condition (A), the amounts of liquid water or ice remaining in the anode channels 4*a*A, 4*b*A are highly likely to be close to each other. This is because, when the temperatures of the FCs 4*a*, 4*b* are close to each other, the amounts of condensed water produced in the anode channels 4*a*A, 4*b*A are highly likely to be close to each other, or the amounts of ice that exists without being melted are highly likely to be close to each other. The "predetermined value" used in condition (A) is 5° C., for example. Each temperature of the FCs 4*a*, 4*b* may be estimated by the ECU 3, based on the detection results of the temperature sensors Ta, Tb, for example, or may be obtained by temperature sensors provided directly on the FCs 4*a*, 4*b*, respectively.

As the stoichiometric ratios of the fuel gas supplied to the FCs 4*a*, 4*b* are larger, the liquid water in the respective anode channels 4*a*A, 4*b*A is more likely to be discharged to the outside under the gas flow, and the amounts of liquid water remaining in the anode channels 4*a*A, 4*b*A are smaller. Accordingly, when the stoichiometric ratios of the fuel gas of the FCs 4*a*, 4*b* are close to each other, as specified by condition (B), the amounts of liquid water remaining in the anode channels 4*a*A, 4*b*A are highly likely to be close to each other. The "predetermined value" used in condition (B) is a value smaller than 0.2, for example. In this connection, the stoichiometric ratio of the fuel gas of the FC 4*a* can be calculated by dividing the amount of fuel gas actually supplied from the INJ 26*a* to the FC 4*a*, by the theoretical fuel gas amount that is based on the amount of electric power required to be generated by the FC 4*a*, and stored in advance in the ROM of the ECU 3. The stoichiometric ratio of the fuel gas of the FC 4*b* can be calculated in the same manner.

As the pressures in the anode channels 4*a*A, 4*b*A are higher, the dew-point temperatures and saturation water vapor pressures are higher, and the amounts of liquid water remaining in the respective anode channels 4*a*A, 4*b*A are larger. When the pressures in the anode channels 4*a*A, 4*b*A are close to each other, as specified by condition (C), the amounts of liquid water remaining in the anode channels 4*a*A, 4*b*A are highly likely to be close to each other. The "predetermined value" used in condition (C) is a value lower than 20 kPa, for example. The pressures in the anode channels 4*a*A, 4*b*A can be detected by the pressure sensors Pa, Pb, respectively. While the pressures in the anode channels 4*a*A, 4*b*A are obtained at the outlet sides of the FCs 4*a*, 4*b*, respectively, in this embodiment, the manner of obtaining the pressures is not limited to this. For example, the pressures may be obtained at the inlet sides of the FCs 4*a*, 4*b*, and these pressures may be compared with each other.

As the stoichiometric ratios of the oxidant gas of the FCs 4*a*, 4*b* are larger, the liquid water in the respective cathode channels 4*a*C, 4*b*C is more likely to be discharged to the outside under the gas flow, and the amount of liquid water that moves from the cathode channel 4*a*C to the anode channel 4*a*A via the electrolyte membrane and the amount of liquid water that moves from the cathode channel 4*b*C to the anode channel 4*b*A via the electrolyte membrane are reduced. As a result, the amounts of liquid water remaining in the anode channels 4*a*A, 4*b*A are reduced. When the stoichiometric ratios of the oxidant gas of the FCs 4*a*, 4*b* are close to each other, as specified by condition (D), the amounts of liquid water remaining in the anode channels 4*a*A, 4*b*A are highly likely to be close to each other. The "predetermined value" used in condition (D) is a value smaller than 0.2, for example. In this connection, the stoichiometric ratio of the oxidant gas of the FC 4*a* can be calculated by dividing the amount of oxidant gas actually supplied to the FC 4*a* via the air compressor 14*a* and the bypass valve 15*a*, by the theoretical oxidant gas amount that is based on the amount of electric power required to be generated by the FC 4*a*, and stored in advance in the ROM of the ECU 3. The stoichiometric ratio of the oxidant gas of the FC 4*b* can be calculated in the same manner.

As the output current densities of the unit cells 4*a*2, 4*b*2 are larger, the amounts of water produced per unit cell 4*a*2, 4*b*2, respectively, are larger, and the amounts of liquid water remaining in the respective anode channels 4*a*A, 4*b*A are larger. When the output current densities of the unit cells 4*a*2, 4*b*2 are close to each other, as specified by condition (E), the amounts of liquid water remaining in the anode channels 4*a*A, 4*b*A are highly likely to be close to each other. The output current density of the unit cell 4*a*2 can be obtained by dividing the current value of the FC 4*a* detected by the current sensor Aa, by the effective power generation area of the unit cell 4*a*2. Similarly, the output current density of the unit cell 4*b*2 can be obtained by dividing the current value of the FC 4*b* detected by the current sensor Ab, by the effective power generation area of the unit cell 4*b*2. To this end, the effective power generation areas per unit cell 4*a*2, 4*b*2, respectively, are stored in advance in the ROM of the ECU 3. The "predetermined value" used in condition (E) is a value smaller than 0.1 A/cm$^{-2}$, for example.

While the unit cells 4*a*2 and the unit cells 4*b*2 are the same members in this embodiment, the above condition (E) may be applied to the case where the effective power generation area is different between the unit cells 4*a*2 and the unit cells 4*b*2.

Since the unit cells 4*a*2, 4*b*2 are the same members in this embodiment, and thus, the the effective power generation area of the unit cell 4*a*2 is equal to that of the unit cell 4*b*2, condition (E') that a difference between the output current of the FC 4a and that of the FC 4b is smaller than a predetermined value may be used, in place of the above condition (E). The "predetermined value" in condition (E') is a value smaller than 50 A, for example. In this case, the output currents of the FCs 4a, 4b can be directly detected by the current sensors Aa, Ab, respectively.

Thus, the ECU 3 determines whether any of the unit cells 4b2 of the FC 4b is in a fuel deficiency state, not only based on the detection result of the voltage sensor Va, but also depending on whether the predetermined condition is satisfied; therefore, the determination accuracy is improved. With the determination accuracy thus improved, the cancellation process can be performed on the FC 4b only when any of the unit cells 4b2 is highly likely to be in a fuel deficiency state, and wasteful execution of the cancellation process can be avoided when there is a high possibility that none of the unit cells 4b2 is in a fuel deficiency state. It is preferable that the "predetermined condition" includes at least condition (A), because the amount of condensed water produced and the amount of ice have the largest correlation with the temperature. It is further preferable that the "predetermined condition" includes conditions (B), (C), because operating conditions on the anode side largely contribute to the amount of water in the anode.

When the FC 4a and the FC 4b are the same fuel cells, as in this embodiment, the predetermined condition may include at least one of conditions (A) to (E), but need not include all of conditions (A) to (E). If the number of conditions, out of conditions (A) to (E), included in the predetermined condition is large, the determination accuracy on the fuel deficiency state concerning the unit cells 4b2 becomes excessively high or strict, and the predetermined condition may not be satisfied, even though any of the unit cells 4b2 is actually placed in a fuel deficiency state; as a result, the cancellation process may not be performed on the FC 4b. Also, while the unit cells 4a2 and the unit cells 4b2 are the same unit cells in this embodiment, they are not necessarily the same cells. For example, the shape and/or size of at least one of the separators 420, 440 and the diffusion layers 416a, 416c may be different between the unit cells 4a2 and the unit cell 4b2.

Regarding the unit cells 4a2, 4b2, it is preferable that the electrolyte membrane 412 is made of the same material, and has substantially the same thickness, the catalyst layer 414a is made of the same material, and has substantially the same amount per unit area, and the catalyst layer 414c is made of the same material, and has substantially the same amount per unit area. In this case, when the unit cells 4a2 and the unit cells 4b2 operate under the same operating conditions, the unit cells 4a2, 4b2 exhibit substantially the same power generation characteristics, and produce substantially the same amount of liquid water; therefore, the fuel deficiency state is equally likely to be generated. When at least one of the above conditions (A) to (E) is satisfied, this possibility becomes higher, and the ECU 3 determines, with improved accuracy, whether any of the unit cells 4b2 is in the fuel deficiency state. Here, "substantially the same" mentioned above has a meaning including differences in the thickness or amount in the case where the output power density varies within a range of about ±5% under the same conditions, and including the case where the thickness or amount itself varies within a range of about ±10%, which is a value determined in view of variations in the thickness or amount among individual products, or changes in the thickness or amount due to chronological deterioration.

First Modified Example of Fuel Deficiency Determination Control

Figure 5:
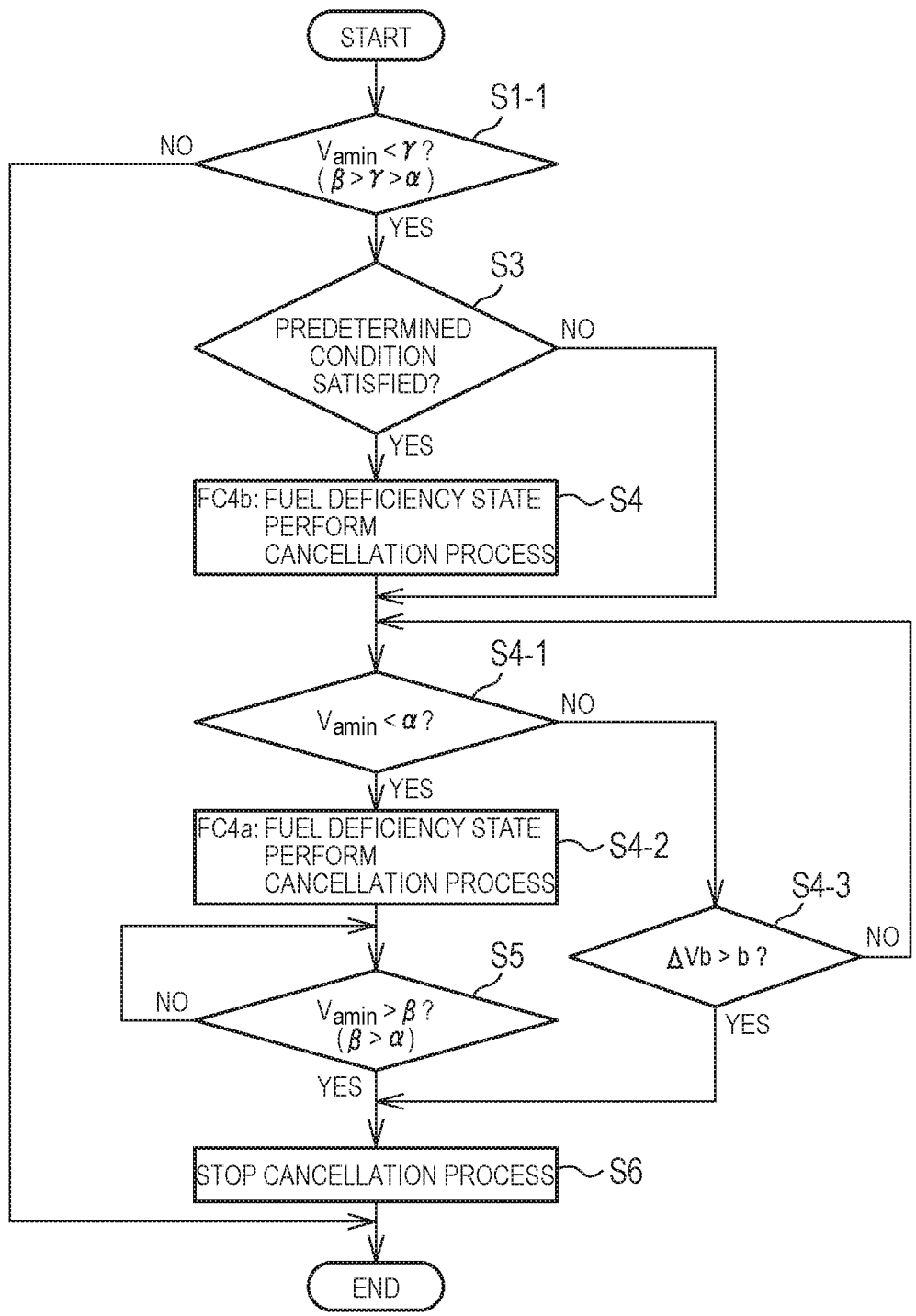
FIG. 5 is a flowchart showing a first modified example of the fuel deficiency determination control.

FIG. 5 is a flowchart showing a first modified example of the fuel deficiency determination control. In FIG. 5, the same step numbers are assigned to the same steps as those of the control routine of the illustrated embodiment, and these steps will not be repeatedly described.

The ECU 3 determines whether the minimum value $V_{amin}$ is smaller than a threshold value γ (step S1-1). The threshold value γ is larger than the above-indicated threshold value α, and smaller than the threshold value β, and is equal to 0.15 V, for example. When a negative decision (NO) is obtained in step S1-1, the current cycle of this control routine ends. When an affirmative decision (YES) is obtained in step S1-1, the ECU 3 determines whether the "predetermined condition" is satisfied (step S3). When an affirmative decision (YES) is obtained in step S3, the ECU 3 determines that any of the unit cells 4b2 of the FC 4b is in a fuel deficiency state, and performs the cancellation process for cancelling the fuel deficiency state, on the FC 4b (step S4). When a negative decision (NO) is obtained in step S3, step S4 is not executed.

When an affirmative decision (YES) is obtained in step S3, the ECU 3 executes step S4, and then determines whether the minimum value $V_{amin}$ is smaller than the threshold value α (step S4-1). The threshold value α is equal to 0.1 V, for example, as in step S1 of the illustrated embodiment, but is not limited to this value. When an affirmative decision (YES) is obtained in step S4-1, the ECU 3 determines that any of the unit cells 4a2 of the FC 4a is in a fuel deficiency state, and performs the cancellation process on the FC 4a (step S4-2). After step S4-2 is executed, the ECU 3 determines whether the minimum value $V_{amin}$ is larger than the threshold value β (step S5). When a negative decision (NO) is obtained in step S5, the ECU 3 determines that the fuel deficiency state has not been sufficiently cancelled, and step S5 is executed again. When an affirmative decision (YES) is obtained in step S5, the ECU 3 stops the cancellation process that is being executed (step S6).

When a negative decision (NO) is obtained in step S4-1, the ECU 3 determines whether the amount of increase ΔVb of the voltage of the FC 4b has become larger than a threshold value b, since the cancellation process started being performed on the FC 4b (step S4-3). The threshold value b is set to an amount of increase of the voltage that can be taken by the FC 4b, when the fuel deficiency state in at least any of the unit cells 4b2 is cancelled. When an affirmative decision (YES) is obtained in step S4-3, the ECU 3 determines that the fuel deficiency state in the FC 4b has been sufficiently cancelled, and the cancellation process is stopped (step S6). When a negative decision (NO) is obtained in step S4-3, step S4-1 is executed again.

As described above, in the first modified example of the fuel deficiency determination control, the ECU 3 determines whether any of the unit cells 4b2 of the FC 4b is in a fuel deficiency state, before the determination is made on the FC 4a, and the cancellation process is performed on the FC 4b, earlier than that on the FC 4a, when the ECU 3 determines that any of the unit cells 4b2 of the FC 4b is in the fuel deficiency state. Since the voltage of each of the unit cells 4b2 of the FC 4b cannot be accurately detected, the fuel deficiency state may progress in the FC 4b, earlier than that in the FC 4a. Thus, the determination as to the possibility of the fuel deficiency state is made on the FC 4b, earlier than that on the FC 4*a*, before reduction of the voltage of the FC 4*b* progresses, and the cancellation process is carried out early when the ECU 3 determines that any of the unit cells 4*b*2 of the FC 4*b* is in the fuel deficiency state.

In the first modified example of the fuel deficiency determination control, step S4-1 may not be executed, for example, but the cancellation process may be performed on the FC 4*a* in step S4-2, after a lapse of a predetermined time from the time when affirmative decisions (YES) are obtained in steps S1-1 and S3, and the cancellation process starts being performed on the FC 4*b* in step S4.

Second Modified Example of Fuel Deficiency Determination Control

Figure 6:
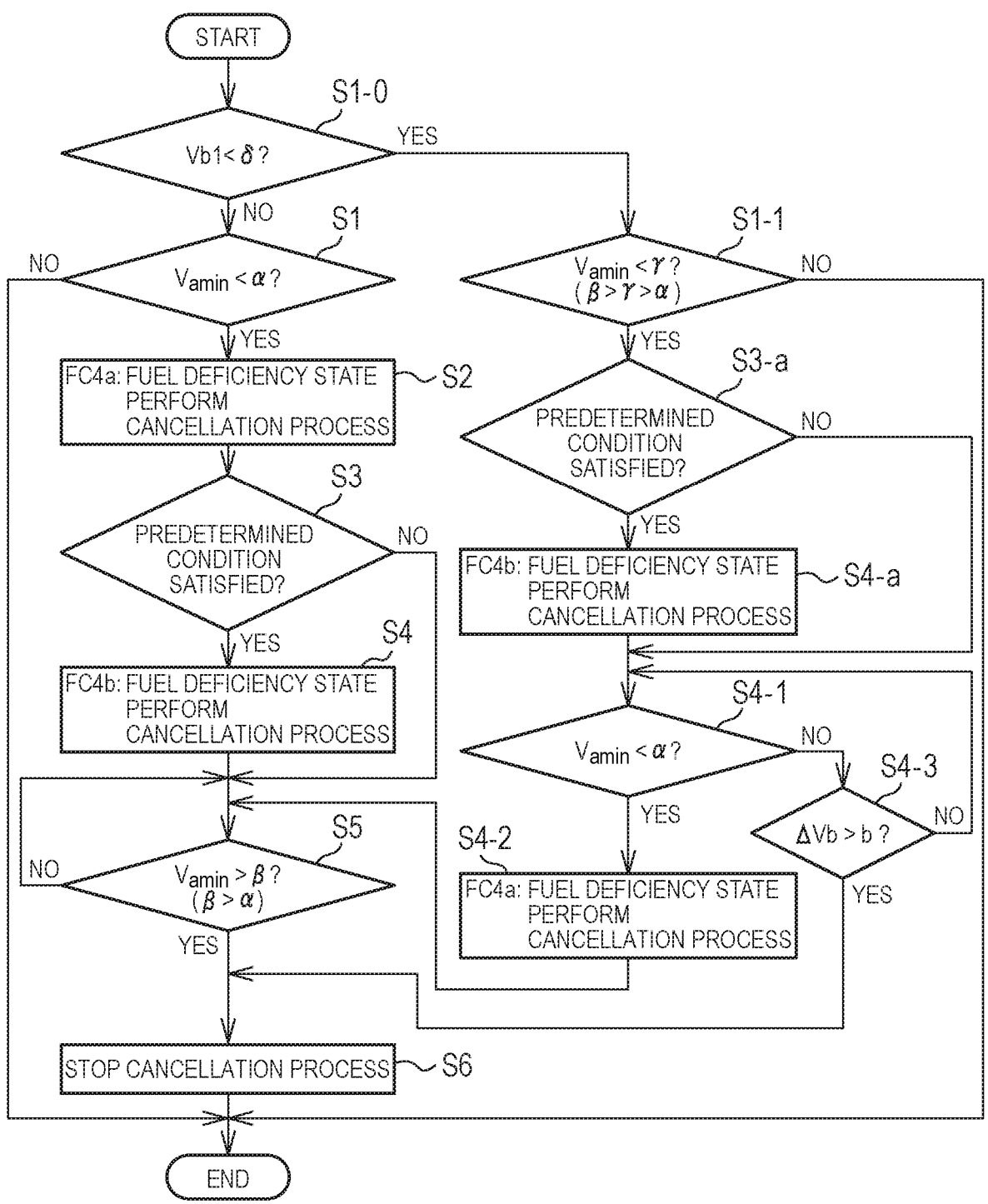
FIG. 6 is a flowchart showing a second modified example of the fuel deficiency determination control.

FIG. 6 is a flowchart showing a second modified example of the fuel deficiency determination control. In FIG. 6, the same step numbers are assigned to the same steps as those of the control routine of the illustrated embodiment, and these steps will not be repeatedly described. Initially, the ECU 3 determines whether a voltage value Vb1 detected by the voltage sensor Vb is smaller than a predetermined threshold value (step S1-0). The voltage value Vb1 is one example of a voltage parameter correlated with the voltage of the FC 4*b*. When a negative decision (NO) is obtained in step S1-0, steps S1 to S6 are executed in the same manner as in the illustrated embodiment. When an affirmative decision (YES) is obtained in step S1-0, steps S1-1, S3-*a*, S4-*a*, S4-1, and step S4-2 or S4-3 are executed. Steps S1-1, S4-1, S4-2, and S4-3 are identical with those of the first modified example of the fuel deficiency determination control as described above. Also, steps S3-*a*, S4-*a* have the same contents as those of steps S3, S4, respectively.

Namely, when the voltage value Vb1 is equal to or larger than the threshold value δ, the ECU 3 determines whether the FC 4*a* is in a fuel deficiency state, and then determines whether the FC 4*b* is in a fuel deficiency state, as in the illustrated embodiment. When the voltage value Vb1 is smaller than the threshold value δ, the ECU 3 determines whether any of the unit cells 4*b*2 of the FC 4*b* is in a fuel deficiency state, and then makes the same determination on the FC 4*a*, as in the first modified example. When the ECU 3 determines that any of the unit cells 4*b*2 is in the fuel deficiency state, it performs the cancellation process on the FC 4*b*, earlier than that on the FC 4*a*. This is because, as the voltage value Vb1 of the FC 4*b* is lower, there is a higher possibility that the fuel deficiency state is generated in any of the unit cells 4*b*2 of the FC 4*b*, and reduction of the voltage progresses.

The threshold value δ may be a fixed value, or may be set to a value that varies according to the required output of the FC 4*b*. For example, the threshold value δ may be set to a smaller value as the required output of the FC 4*b* is larger. This is because the voltage of the FC 4*b* is reduced as the output of the FC 4*b* increases.

In the case where the FC 4*b* is provided with a voltage sensor that detects the voltage for every two or more unit cells, for example, the ECU 3 may determine in step S1-0 that the voltage of the FC 4*b* is smaller than the threshold value δ, when any of two or more detection values obtained by the voltage sensor is smaller than a threshold value. Also, in the case where the FC 4*b* is provided with a voltage sensor that detects the voltage for every two or more unit cells, for example, the ECU 3 may determine that the voltage of the FC 4*b* is smaller than the threshold value δ, when the average of two or more detection values obtained by the voltage sensor is smaller than a threshold value. Also, when the reciprocal of the voltage value Vb1 is equal to or larger than a predetermined threshold value, the ECU 3 may determine that the voltage of the FC 4*b* is smaller than the threshold value S. The two or more detection values obtained by the voltage sensor, the average of the detection values, the reciprocal of the voltage value Vb1, etc. are examples of the voltage parameter correlated with the voltage of the FC 4*b*.

Third Modified Example of Fuel Deficiency Determination Control

Figure 7:
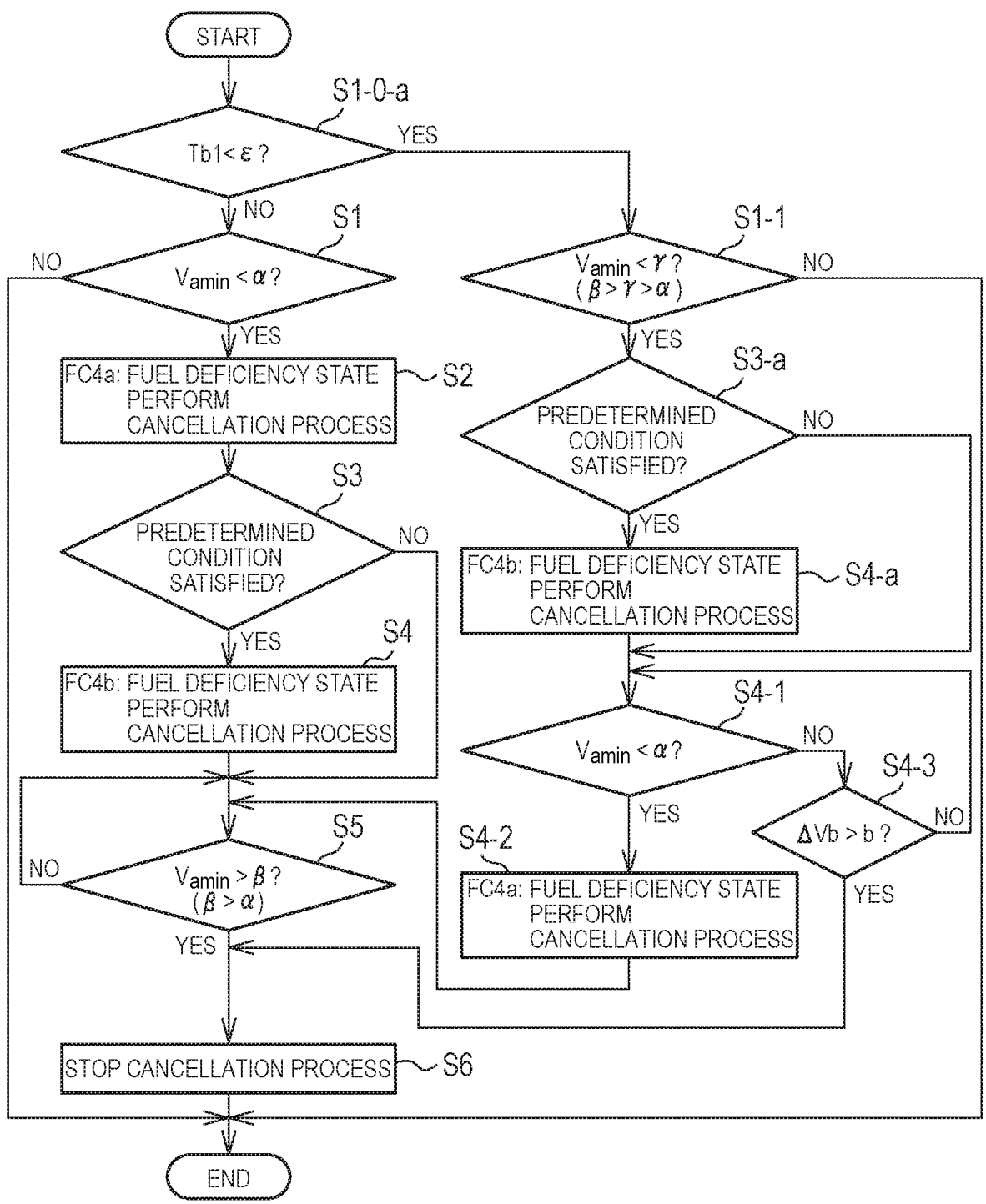
FIG. 7 is a flowchart showing a third modified example of the fuel deficiency determination control.

FIG. 7 is a flowchart showing a third modified example of the fuel deficiency determination control. In FIG. 7, the same step numbers are assigned to the same steps as those of the control routine of the illustrated embodiment, and these steps will not be repeatedly described. In the third modified example of the fuel deficiency determination control, the ECU 3 determines whether the temperature Tb1 detected by the temperature sensor Tb is lower than a threshold value ε (step 1-0-*a*), instead of executing step S1-0 indicated in the second modified example of the fuel deficiency determination control. The other steps are identical with those of the second modified example. The temperature Tb1 is one example of a temperature parameter correlated with the temperature of the FC 4*b*.

Namely, when the temperature Tb1 is equal to or higher than the threshold value ε, the ECU 3 determines whether any of the unit cells 4*b*2 of the FC 4*b* is in a fuel deficiency state, after the same determination is made on the FC 4*a*, as in the illustrated embodiment. When the temperature Tb1 is lower than the threshold value ε, the ECU 3 determines whether any of the unit cells 4*b*2 of the FC 4*b* is in a fuel deficiency state, and then makes the same determination on the FC 4*a*, as in the first modified example. When the ECU 3 determines that any of the unit cells 4*b*2 is in the fuel deficiency state, it performs the cancellation process on the FC 4*b*, earlier than that on the FC 4*a*. This is because, as the temperature Tb1 of the FC 4*b* is lower, there is a higher possibility that the fuel deficiency state is generated in any of the unit cells 4*b*2 of the FC 4*b*, and reduction of the voltage progresses. The threshold value ε is 30° C., for example, but is not limited to this.

The temperature Tb1 of the FC 4*b* can be estimated based on the temperature sensor Tb that detects the temperature of the coolant that flows through the FC 4*b*, but the manner of obtaining the temperature Tb1 is not limited to this. For example, a temperature sensor that directly detects the temperature of the FC 4*b* may be used, or a temperature sensor that is not in direct contact with the FC 4*b*, but is located in the vicinity of the FC 4*b* to which the temperature of the FC 4*b* is sufficiently transmitted, may be used. Accordingly, in step S1-0-*a*, when the temperature detected by any of these temperature sensors is equal to or lower than a threshold value, the ECU 3 may determine that the temperature of the FC 4*b* is lower than the threshold value ε. Also, when the reciprocal of the temperature Tb1 is equal to or larger than a predetermined threshold value, the ECU 3 may determine that the temperature of the FC 4*b* is lower than the threshold value ε. The temperatures detected in the manners as described above, the reciprocal of the temperature Tb1, etc. are examples of the temperature parameter correlated with the temperature of the FC 4*b*.

When the voltage value Vb1 is smaller than the voltage threshold value δ, and the temperature Tb1 is lower than the temperature threshold value ε, step S1 and subsequent steps may be executed. When these conditions are not satisfied, step S1-1 and subsequent steps may be executed.

Fourth Modified Example of Fuel Deficiency Determination Control

FIG. 8 is a flowchart showing a fourth modified example of the fuel deficiency determination control. In FIG. 8, the same step numbers are assigned to the same steps as those of the control routine of the illustrated embodiment, and these steps will not be repeatedly described. While the fuel deficiency determination control of the fourth modified example is similar to that of the illustrated embodiment shown in FIG. 4, they are different in that a state control process as described below is carried out (step S1-a), before execution of step S1.

State Control Process

The state control process, which is performed by the ECU 3, is a process for controlling the states of the FCs 4a, 4b, so that any of the unit cells 4b2 of the FC 4b is placed in a state where a fuel deficiency state is less likely to be generated than any of the unit cells 4a2 of the FC 4a, or in a state equivalent to that of the FC 4a. For example, in the fuel deficiency determination control of the illustrated embodiment shown in FIG. 4, when a fuel deficiency state progresses in any of the unit cells 4b2 of the FC 4b, to a greater extent than that in any of the unit cells 4a2 of the FC 4a, for some reason, the cancellation process is not performed on the FC 4b, unless affirmative decisions (YES) are obtained in step S1 and step S3, namely, unless any of the unit cells 4a2 of the FC 4a is placed in a fuel deficiency state. Thus, the output performance of any of the unit cells 4b2 may be reduced. In this case, if the state control process is performed as in the fourth modified example, the fuel deficiency state is less likely or unlikely to progress in any of the unit cells 4b2. The state control process may be performed all the time during operation of the fuel cell system, or may be performed only under conditions where the fuel in the fuel cell is likely to be deficient (e.g., when the temperature of the fuel cell is low).

In the state control process, the amount of liquid water or ice that can be present in the anode channel 4bA of the FC 4b is made smaller than or equivalent to the amount of liquid water or ice that can be present in the anode channel 4aA of the FC 4a, so that any of the unit cells 4b2 is placed in a state where the fuel deficiency state is less likely to be generated as compared with any of the unit cells 4a2, or the fuel deficiency state is equally likely to be generated in the unit cells 4b2 and the unit cells 4a2. For example, at least one of the following states (1) to (5) is achieved, so that the fuel deficiency state is less likely to be generated in the FC 4b, than in the FC 4a, or the fuel deficiency state is equally likely to be generated in the FC 4b and the FC 4a.
(1) The temperature of the FC 4b is equal to or higher than that of the FC 4a.
(2) The stoichiometric ratio of the fuel gas supplied to the FC 4b is equal to or larger than that of the fuel gas supplied to the FC 4a.
(3) The pressure in the anode channel 4bA through which the fuel gas flows in the FC 4b is equal to or lower than the pressure in the anode channel 4aA through which the fuel gas flows in the FC 4a.
(4) The stoichiometric ratio of the oxidant gas supplied to the FC 4b is equal to or larger than that of the oxidant gas supplied to the FC 4a.
(5) The output current density of the unit cell 4b2 is equal to or smaller than that of the unit cell 4a2.

For example, the above state (1) can be achieved by reducing the rotating speed of the WP 46b to a lower speed than that of the WP 46a, or controlling the opening of the bypass valve 45b so as to reduce the flow rate of the coolant that flows through the radiator 44b, to a smaller rate than that of the coolant that flows through the radiator 44a, for example.

The above state (2) can be achieved by making the ratio of the valve-opening period to the overall period as the sum of the valve-opening period and valve-closing period of the INJ 26b larger than that of the INJ 26a when the injection amount of the fuel gas per unit time from the INJs 26a, 26b is equal. Since the fuel is insufficient when the stoichiometric ratio of the fuel gas is smaller than 1, it is assumed, with respect to the state (2), that the stoichiometric ratio of the fuel gas supplied to either of the FC 4a and FC 4b is equal to or larger than 1. The above state (3) can be achieved by reducing the ratio of the valve-opening period to the overall period of the INJ 26b, to a smaller ratio than that of the INJ 26a, for example. Either one of the above states (2) and (3) may be achieved, since it is difficult to achieve both of these states. For example, in a condition where the outside air temperature is relatively low, and condensed water is likely to be produced in the anode channels 4aA, 4bA, the above state (3) is achieved while the stoichiometric ratios of the fuel gas supplied to both the FCs 4a, 4b are controlled to a substantially equal value equal to or larger than 1, so that the amount of condensed water produced in the anode channel 4bA can be reduced to be smaller than that in the anode channel 4aA. Also, in a condition where the outside air temperature is relatively high, the above state (2), rather than (3), may be achieved. The above state (4) may be achieved by increasing the rotating speed of the air compressor 14b to a higher speed than that of the air compressor 14a, for example.

The above state (5) may be achieved by controlling the FDCs 32a, 32b so as to reduce a value of current swept from the FC 4b to a smaller value than that of current swept from the FC 4a. In this case, it is preferable to increase the output of the FC 4a, by an amount by which the output of the FC 4b is reduced, so as to satisfy the required output P of the FCs 4a, 4b.

It is preferable that a difference in the temperature between the FCs 4a, 4b in the state (1), a difference in the stoichiometric ratio in the states (2) and (4), a difference in the pressure in the state (3), and a difference in the output current density in the state (5) are set to be within respective ranges in which the required output P of the FCs 4a, 4b can be satisfied, and no problem occurs to operation of the FCs 4a, 4b.

Thus, depending on the magnitude of the difference in each parameter set in the state control process, and the magnitude of the difference in each parameter when the "predetermined condition" under which the states of the FCs 4a, 4b can be regarded as being close to each other is satisfied, there may be the case where the state control process is performed, but the "predetermined condition" is satisfied. Also, even though the difference in each parameter in the state control process is intended to be set so that the "predetermined condition" is not satisfied, the "predetermined condition" may be temporarily satisfied. For example, even though the above state (1) is established as the state control process, the FC 4b may be located at a position where it is more likely to be cooled than the FC 4a, due to wind during high-speed traveling, for example. In view of this case, when the "predetermined condition" is satisfied, even though the state control process is performed, the ECU 3 determines that any of the unit cells 4$b$2 of the FC 4$b$ is in a fuel deficiency state, and performs the cancellation process on the FC 4$b$ (step S4).

The state control process may be performed in the first, second, and third modified examples.

Fifth Modified Example of Fuel Deficiency Determination Control

FIG. 9 is a flowchart showing a fifth modified example of the fuel deficiency determination control. In FIG. 9, the same step numbers are assigned to the same steps as those of the control routine of the illustrated embodiment, and these steps will not be repeatedly described. While the fuel deficiency determination control of the fifth modified example is similar to that of the illustrated embodiment shown in FIG. 4, the ECU 3 determines whether the temperature T$a$1 of the FC 4$b$ is lower than the temperature T$a$1 of the FC 4$a$ (step S3-1) when a negative decision (NO) is obtained in step S3. When an affirmative decision (YES) is obtained in step S3-1, the ECU 3 determines that any of the unit cells 4$b$2 of the FC 4$b$ is in a fuel deficiency state, and performs the cancellation process for cancelling the fuel deficiency state, on the FC 4$b$ (step S4). When a negative decision (NO) is obtained in step S3-1, the ECU 3 determines whether the minimum value V$_{amin}$ is larger than the threshold value β (step S5).

A negative decision (NO) is obtained in step S3, and an affirmative decision (YES) is obtained in step S3-1, when the states of the FCs 4$a$, 4$b$ are not close to each other, but any of the unit cells 4$b$2 of the FC 4$b$ is more likely to be placed in a fuel deficiency state than any of the unit cells 4$a$2 of the FC 4$a$. In this case, too, the fuel deficiency state of the FC 4$b$ can be cancelled. Negative decisions (NO) are obtained in step S3 and step S3-1, when the states of the FCs 4$a$, 4$b$ are not close to each other, and any of the unit cells 4$b$2 of the FC 4$b$ is less likely to be placed in a fuel deficiency state than any of the unit cells 4$a$2 of the FC 4$a$.

As described above, step S3-1 is the step of determining whether a condition indicating a state where any of the unit cells 4$b$2 of the FC 4$b$ is more likely to be placed in a fuel deficiency state than any of the unit cells 4$a$2 of the FC 4$a$ is satisfied. Accordingly, in step S3-1, the ECU 3 may determine at least one of (1a) whether the temperature of the FC 4$b$ is lower than the temperature of the FC 4$a$, (2a) whether the stoichiometric ratio of the fuel gas supplied to the FC 4$b$ is smaller than that of the fuel gas supplied to the FC 4$a$, (3a) whether the pressure in the anode channel 4$b$A through which the fuel gas flows in the FC 4$b$ is higher than the pressure in the anode channel 4$a$A through which the fuel gas flows in the FC 4$a$, (4a) whether the stoichiometric ratio of the oxidant gas supplied to the FC 4$b$ is smaller than that of the oxidant gas supplied to the FC 4$a$, and (5a) whether the output current density of the unit cell 4$b$2 is larger than that of the unit cell 4$a$2. As described above, (1a) is determined, because the amount of liquid water remaining in the anode channel 4$b$A or the amount of ice is larger as the temperature of the FC 4$b$ is lower. Also, each of (2a) to (5a) is determined, because the amount of liquid water remaining in the anode channel 4$b$A is larger, as the stoichiometric ratio of the fuel gas of the FC 4$b$ is smaller, or as the pressure in the anode channel 4$b$A is higher, or as the stoichiometric ratio of the oxidant gas supplied to the FC 4$b$ is smaller, or as the output current density of the unit cell 4$b$2 is larger.

The operation of step S3-1 may be employed in the first to third modified examples as described above. Also, it may be employed in the fourth modified example, because, even when the state control process is performed, any of the unit cells 4$b$2 of the FC 4$b$ may be more likely to be placed in a fuel deficiency state than any of the unit cells 4$a$2 of the FC 4$a$, depending on the environment surrounding the FC 4$a$ and FC 4$b$, and their operating conditions.

While the ECU 3 refers to the minimum value V$_{amin}$ of the voltages detected by the voltage sensor Va, in steps S1, S1-1, S4-1, and S5 shown in FIG. 3A to FIG. 9, the voltage referred to in these steps is not limited to this. For example, the ECU 3 may select one of the respective voltages of the unit cells 4$a$2 detected by the voltage sensor Va, which has the largest rate of reduction, and determine whether the largest value of the rate of reduction of the voltage is equal to or larger than a threshold value. Also, the ECU 3 may calculate the average value of voltage per unit cell, by dividing the total value of the respective voltages of the unit cells 4$a$2, by the number of the unit cells 4$a$2, and determine whether the maximum value of values obtained by subtracting respective voltages of the unit cells 4$a$2 from the average value is equal to or larger than a threshold value. When an affirmative decision (YES) is obtained in the above determination, it indicates that the degree of reduction of the voltage of the unit cell in question is large, and the unit cell 4$a$2 can be regarded as being in a fuel deficiency state. The above methods may be combined together.

First Modified Example of Voltage Sensors

Figure 10A:
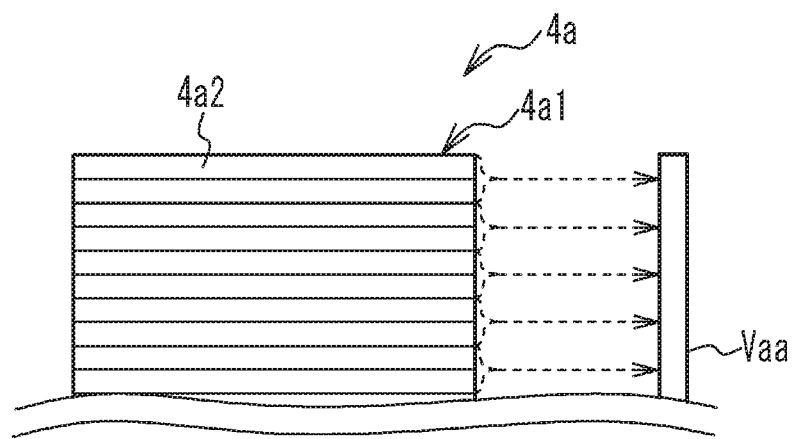
FIG. 10A is an explanatory view of a voltage sensor used in a first modified example.
Figure 10B:
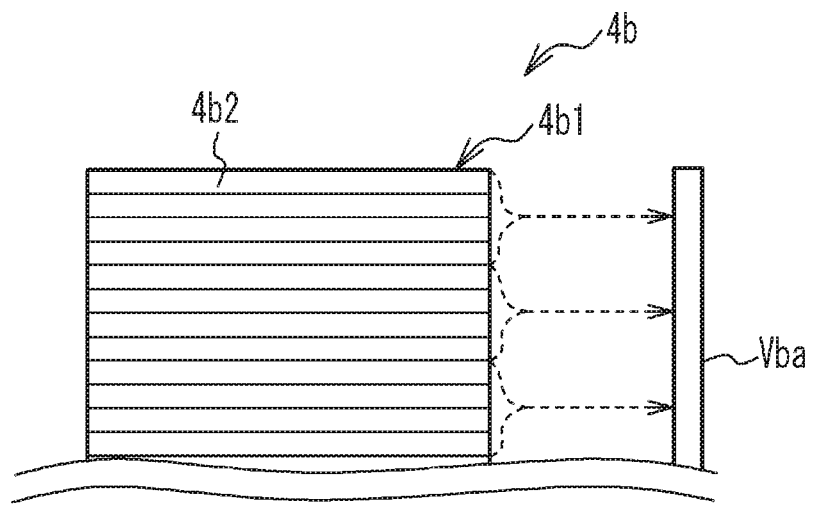
FIG. 10B is an explanatory view of another voltage sensor used in the first modified example.

FIG. 10A and FIG. 10B show a first modified example of voltage sensors. FIG. 10A shows a part of a voltage sensor Vaa, and FIG. 10B shows a part of a voltage sensor Vba. The voltage sensor Vaa detects a voltage for every two unit cells, with respect to all unit cells 4$a$2 of the FC 4$a$. Namely, the number of detection channels of the voltage sensor Vaa is one half of the total number of the stacked unit cells 4$a$2. On the other hand, the voltage sensor Vba detects a voltage for every four unit cells, with respect to all unit cells 4$b$2 of the FC 4$b$. Accordingly, the number of detection channels of the voltage sensor Vba is one-fourth of the total number of the stacked unit cells 4$b$2. In this case, too, the number of detection channels of the voltage sensor Vba is smaller than that of the voltage sensor Vaa, and thus, the manufacturing cost of the voltage sensor Vba is lower than that of the voltage sensor Vaa. Accordingly, the manufacturing cost is reduced, as compared with the case where a voltage sensor that detects a voltage for every two unit cells of the unit cells 4$b$2 is provided for the FC 4$b$, as is the case with the FC 4$a$.

In steps S1, S1-1, S4-1, and S5, the minimum value of the voltages detected by the voltage sensor Vaa may be used, or the voltage of each of the unit cells 4$a$2 may be calculated from the voltages detected by the voltage sensor Vaa, and the minimum value of the voltages thus calculated may be used. Similarly, in step S1-0, the total value of the voltages detected by the voltage sensor Vba may be used as the voltage value Vb1, or the average value of the voltages of the unit cells 4$b$2 per unit cell may be calculated from the detected voltages, and the average value may be used as the voltage value Vb1. Similarly, in step S4-3, the amount of increase ΔVb calculated from these voltage values may be used.

While the voltage sensor Vaa detects the voltage of the unit cells 4a2 for every two unit cells, and the voltage sensor Vba detects the voltage of the unit cells 4b2 for every four unit cells, the manner of detecting voltage is not limited to this, but the voltage sensor Vaa may detect the voltage of the unit cells 4a2 for every "n" unit cells, and the voltage sensor Vba may detect the voltage of the unit cells 4b2 for every "m" unit cells, where "m" is larger than "n".

Second Modified Example of Voltage Sensors

Figure 11A:
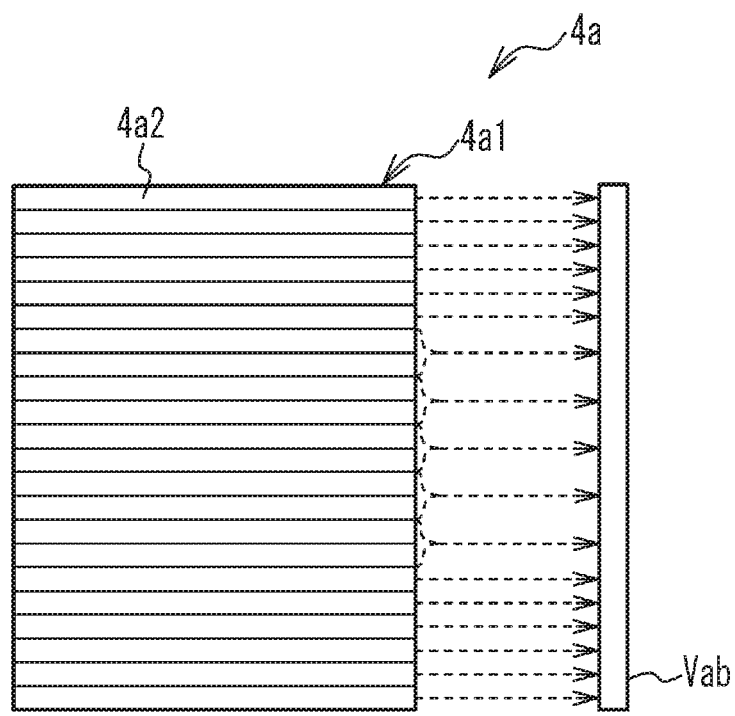
FIG. 11A is an explanatory view of a voltage sensor used in a second modified example.
Figure 11B:
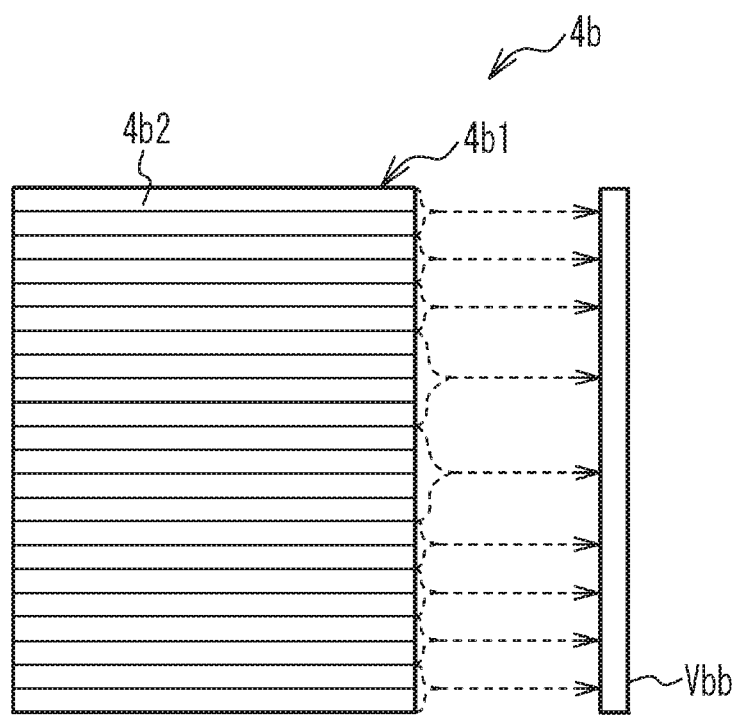
FIG. 11B is an explanatory view of another voltage sensor used in the second modified example.

FIG. 11A and FIG. 11B show a second modified example of voltage sensors. A voltage sensor Vab detects a voltage for each unit cell, with respect to a part of the unit cells 4a2, and detects a voltage for every two unit cells, with respect to another part of the unit cells 4a2. A voltage sensor Vbb detects a voltage for every two unit cells, with respect to a part of the unit cells 4b2, and detects a voltage for every four unit cells, with respect to another part of the unit cells 4b2. In this case too, the voltage sensor Vab may detect a voltage of the unit cells 4a2 for every "N" unit cells on average over the whole FC 4a, and the voltage sensor Vbb may detect a voltage of the whole FC 4b, or a voltage of the unit cells 4b2 for every "M" unit cells on average over the whole FC 4b, where "M" is larger than "N". In this case, the manufacturing cost of the voltage sensor Vbb is lower than that of the voltage sensor Vab.

In the above case, in steps S1, S1-1, S4-1, and S5, a voltage of each of the unit cells 4a2 may be calculated from the detection result of the voltage sensor Vab, and the minimum value of the voltages thus calculated may be used. In step S1-0, the total value of the voltage values detected by the voltage sensor Vbb may be used as the voltage value Vb1, or the average value of voltages of the unit cells 4b2 per unit cell may be calculated from the detected voltages, and the average value may be used as the voltage value Vb1. Also, in step S4-3, the amount of increase ΔVb calculated from these voltage values may be used.

More specifically, the voltage sensor Vab detects a voltage for each unit cell, with respect to the unit cells 4a2 located in the vicinity of the opposite ends of the stack 4a1, and detects a voltage for every two unit cells, with respect to the unit cells 4a2 located in a middle portion of the stack 4a1. Similarly, the voltage sensor Vbb detects a voltage for every two unit cells, with respect to the unit cells 4b2 located in the vicinity of the opposite ends of the stack 4b1, and detects a voltage for every four unit cells, with respect to the unit cells 4b2 located in a middle portion of the stack 4b1. In this connection, the unit cells 4a2 located in the vicinity of the opposite ends of the stack 4a1 are more likely to be brought into a fuel deficiency state, than the unit cells 4a2 located in the middle portion of the stack 4a1. This is because the opposite end portions of the stack 4a1 are more likely to be cooled under an influence of the outside air temperature, than the middle portion, and condensed water is more likely to be produced or liquid water is more likely to freeze in the unit cells 4a2 in the vicinity of the opposite ends of the stack 4a1. Accordingly, in steps S1, S1-1, S4-1, and S5, it is preferable to use the minimum value $V_{amin}$, out of the voltages of the unit cells 4a2 located in the vicinity of the opposite ends of the stack 4a1. Thus, reduction of the voltage can be detected with high accuracy, with respect to the unit cells 4a2 located in the vicinity of the opposite ends of the stack 4a1 where the unit cells 4a2 are likely to be placed in a fuel deficiency state and the voltage is likely to be reduced. Further, the manufacturing cost of the voltage sensor Vab can be reduced, as compared with the case where the voltage for each unit cell is detected with respect to all of the unit cells 4a2.

When the FC 4a includes 100 or more unit cells 4a2, for example, the voltage sensor Vab may detect a voltage for each unit cell, with respect to 20 unit cells 4a2 located at one end of the stack 4a1, and 20 unit cells 4a2 located at the other end, and detect a voltage for every two unit cells, with respect to the remaining unit cells 4a2 located in the middle portion of the stack 4a1. When the FC 4b includes 100 or more unit cells 4b2, for example, the voltage sensor Vbb may detect a voltage for every two unit cells, with respect to 20 unit cells 4b2 located at one end of the stack 4b1, and 20 unit cells 4b2 located at the other end, and detect a voltage for every four unit cells, with respect to the remaining unit cells 4b2 located in the middle portion of the stack 4b1.

In any case, the voltage sensor connected to the FC 4a may detect voltage of the unit cells 4a2 for every "N" unit cells on average over the whole FC 4a, and the voltage sensor connected to the FC 4b may detect voltage of the whole FC 4b, or voltage of the unit cells 4b2 for every "M" unit cells on average over the whole FC 4b, where "M" is larger than "N".

The above-mentioned "N" unit cells on average can be calculated by dividing the total number of the stacked unit cells 4a2, by the number of detection channels of the voltage sensor connected to the FC 4a. Suppose the total number of the stacked unit cells 4a2 of the FC 4a is 100, and the voltage is detected for each unit cell with respect to 20 unit cells 4a2 at one end of the stack 4a1 and 20 unit cells 4a2 at the other end, while the voltage is detected for every two unit cells with respect to the remaining 60 unit cells 4a2. Since the total number of stacked unit cells is 100, and the number of detection channels is 70, the average "N" is calculated as follows: 100÷70≈1.4. In this case, the voltage sensor connected to the FC 4a detects the voltage of the unit cells 4a2 for approximately every 1.4 unit cells on average.

Similarly, the "M" unit cells on average can be calculated by dividing the total number of the stacked unit cells 4b2, by the number of detection channels of the voltage sensor Vb connected to the FC 4b. Suppose the total number of the stacked unit cells 4b2 of the FC 4b is 100, and the voltage is detected for every two unit cells with respect to 20 unit cells 4b2 at one end of the stack 4b1 and 20 unit cells 4b2 at the other end, while the voltage is detected for every four unit cells with respect to the remaining 60 unit cells 4b2. Since the total number of stacked unit cells is 100, and the number of detection channels of the voltage sensor is 35, the average "M" is calculated as follows: 100÷35≈2.9. In this case, the voltage sensor connected to the FC 4b detects the voltage of the unit cells 4b2 for approximately every 2.9 unit cells on average.

In the case where the total number of the stacked unit cells 4a2 of the FC 4a is smaller than the total number of the stacked unit cells 4b2, the number of detection channels of the voltage sensor connected to the FC 4a may be smaller than that of the voltage sensor connected to the FC 4b, even when the voltage sensor connected to the FC 4a detects the voltage of the unit cells 4a2 for every "N" unit cells on average, and the voltage sensor connected to the FC 4b detects the voltage of the unit cells 4b2 for every "M" unit cells on average. However, in this case, too, the manufacturing cost of the voltage sensor connected to the FC 4b, for each unit cell of the unit cells 4b2, is lower than that of the voltage sensor when it is connected to the FC 4b to detect the voltage for every "N" unit cells of the unit cells 4b2 on average. Thus, the manufacturing cost of the fuel cell system can be reduced, by using the voltage sensor connected to the FC 4b.

While the fuel cell system includes two fuel cells, i.e., the FC 4a and the FC 4b, in the illustrated embodiment and modified examples, the fuel cell system may include three or more fuel cells. In the fuel cell system including three or more fuel cells, the ECU may refer to the detection result of a selected one of voltage sensors respectively connected to the fuel cells, which one detects voltage of unit cells for each set of the minimum number of unit cells, and may determine whether any unit cell of the fuel cells other than the fuel cell to which this voltage sensor is connected is in a fuel deficiency state, based on the detection result of the selected voltage sensor.

While the fuel cell system as described above is installed on the vehicle, the fuel cell system is not limited to this type, but may be of a stationary type. Also, the vehicle is not limited to an automobile, but may be a two-wheel vehicle, rail vehicle, ship, aircraft, or the like.

While the preferred embodiments of the disclosure have been described in detail, the disclosure is not limited to the particular embodiments, but may be embodied with various modifications or changes, within the range of the principle of the disclosure defined in the appended claims.

What is claimed is:

1. A fuel cell system comprising:
a first fuel cell to which a fuel gas and an oxidant gas are supplied, the first fuel cell including a plurality of first unit cells stacked together;
a second fuel cell to which a fuel gas and an oxidant gas are supplied, the second fuel cell including a plurality of second unit cells stacked together;
a first voltage detector connected to the first fuel cell;
a second voltage detector connected to the second fuel cell; and
a controller configured to control the first fuel cell based on a detection result of the first voltage detector, and control the second fuel cell based on a detection result of the second voltage detector, wherein
each of the first unit cells includes a first electrolyte membrane, a first anode catalyst layer provided on a first surface of the first electrolyte membrane, and a first cathode catalyst layer provided on a second surface of the first electrolyte membrane,
each of the second unit cells includes a second electrolyte membrane, a second anode catalyst layer provided on a first surface of the second electrolyte membrane, and a second cathode catalyst layer provided on a second surface of the second electrolyte membrane,
the first electrolyte membrane and the second electrolyte membrane are made of the same material, and have substantially the same thickness,
the first anode catalyst layer and the second anode catalyst layer are made of the same material, and have substantially the same amount per unit area,
the first cathode catalyst layer and the second cathode catalyst layer are made of the same material, and have substantially the same amount per unit area,
the first voltage detector is configured to detect voltage of the first unit cells for every "N" unit cells on average,
the second voltage detector is configured to detect voltage of the second fuel cell as a whole, or detect voltage of the second unit cells for every "M" unit cells on average, where "M" represents a number that is larger than "N", and
the controller is configured to determine whether any of the second unit cells is in a fuel deficiency state, based on the detection result of the first voltage detector, when a predetermined condition under which states of the first fuel cell and the second fuel cell are regarded as being close to each other is satisfied.

2. The fuel cell system according to claim 1, wherein the predetermined condition includes a condition that a difference between a temperature of the first fuel cell and a temperature of the second fuel cell is smaller than a predetermined value.

3. The fuel cell system according to claim 1, wherein the predetermined condition includes a condition that a difference between a stoichiometric ratio of the fuel gas supplied to the first fuel cell and a stoichiometric ratio of the fuel gas supplied to the second fuel cell is smaller than a predetermined value.

4. The fuel cell system according to claim 1, wherein the predetermined condition includes a condition that a difference between a pressure in a first fuel gas channel through which the fuel gas flows in the first fuel cell and a pressure in a second fuel gas channel through which the fuel gas flows in the second fuel cell is smaller than a predetermined value.

5. The fuel cell system according to claim 1, wherein the predetermined condition includes a condition that a difference between a stoichiometric ratio of the oxidant gas supplied to the first fuel cell and a stoichiometric ratio of the oxidant gas supplied to the second fuel cell is smaller than a predetermined value.

6. The fuel cell system according to claim 1, wherein the predetermined condition includes a condition that a difference between a flow rate of coolant that flows in the first fuel cell and a flow rate of coolant that flows in the second fuel cell is smaller than a predetermined value.

7. The fuel cell system according to claim 1, wherein the predetermined condition includes a condition that a difference between an output current density of each of the first unit cells and an output current density of each of the second unit cells is smaller than a predetermined value.

8. The fuel cell system according to claim 1, wherein the controller is configured to perform a cancellation process to cancel the fuel deficiency state, on the second fuel cell, when the controller determines that any of the second unit cells is in the fuel deficiency state.

9. The fuel cell system according to claim 1, wherein the controller is configured to determine whether any of the first unit cells is in the fuel deficiency state, based on the detection result of the first voltage detector.

10. The fuel cell system according to claim 9, wherein the controller is configured to perform a cancellation process to cancel the fuel deficiency state, on the first fuel cell, when the controller determines that any of the first unit cells is in the fuel deficiency state.

11. The fuel cell system according to claim 10, wherein the controller is configured to perform the cancellation process on the second fuel cell, before performing the cancellation process on the first fuel cell, when the controller determines that any of the second unit cells is in the fuel deficiency state.

12. The fuel cell system according to claim 10, wherein the controller is configured to determine whether any of the second unit cells is in the fuel deficiency state, before determining whether any of the first unit cells is in the fuel deficiency state, in at least one of a case where a voltage parameter correlated with a voltage of the second fuel cell indicates that the voltage of the second fuel cell is lower than a predetermined threshold value, and a case where a temperature parameter correlated with a temperature of the second fuel cell indicates that the temperature of the second fuel cell is lower than a predetermined threshold value, the controller being configured to perform the cancellation process on the second fuel cell, before performing the cancellation process on the first fuel cell, when the controller determines that any of the second unit cells is in the fuel deficiency state.

13. The fuel cell system according to claim 1, wherein the controller is configured to determine whether any of the second unit cells is in the fuel deficiency state, based on the detection result of the first voltage detector, when the predetermined condition is not satisfied, but a condition indicating a state where any of the second unit cells is more likely to be placed in the fuel deficiency state than any of the first unit cells is satisfied.

14. The fuel cell system according to claim 1, wherein each of the first unit cells and the second unit cells is comprised of same components.

* * * * *